(12) United States Patent
Polanyi et al.

(10) Patent No.: US 8,346,756 B2
(45) Date of Patent: Jan. 1, 2013

(54) CALCULATING VALENCE OF EXPRESSIONS WITHIN DOCUMENTS FOR SEARCHING A DOCUMENT INDEX

(75) Inventors: Livia Polanyi, Palo Alto, CA (US); Martin Henk Van den Berg, Palo Alto, CA (US); Barney Pell, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 12/201,057

(22) Filed: Aug. 29, 2008

(65) Prior Publication Data

US 2009/0077069 A1    Mar. 19, 2009

Related U.S. Application Data

(60) Provisional application No. 60/969,442, filed on Aug. 31, 2007, provisional application No. 60/969,486, filed on Aug. 31, 2007.

(51) Int. Cl.
*G06F 17/30* (2006.01)

(52) U.S. Cl. ........................................ 707/711
(58) Field of Classification Search ............... 707/5, 711; 704/4, 8
See application file for complete search history.

(56) References Cited

U.S. PATENT DOCUMENTS

| | | | |
|---|---|---|---|
| 4,876,643 A | 10/1989 | McNeil et al. | |
| 5,519,608 A | 5/1996 | Kupiec | |
| 5,530,939 A | 6/1996 | Mansfield, Jr. et al. | |
| 5,696,962 A | 12/1997 | Kupiec | |
| 5,933,822 A | 8/1999 | Braden-Harder et al. | |
| 6,076,051 A | 6/2000 | Messerly | |
| 6,161,084 A | 12/2000 | Messerly | |
| 6,185,592 B1 | 2/2001 | Boguraev et al. | |
| 6,189,002 B1 | 2/2001 | Roitblat | |
| 6,243,670 B1 | 6/2001 | Bessho et al. | |
| 6,246,977 B1 | 6/2001 | Messerly et al. | |
| 6,269,368 B1 | 7/2001 | Diamond | |
| 6,366,908 B1 | 4/2002 | Chong et al. | |
| 6,374,209 B1 | 4/2002 | Yoshimi et al. | |
| 6,529,864 B1 | 3/2003 | Chase | |
| 6,622,140 B1 * | 9/2003 | Kantrowitz | 1/1 |
| 6,654,740 B2 | 11/2003 | Tokuda et al. | |
| 6,675,159 B1 | 1/2004 | Klein et al. | |
| 6,678,677 B2 | 1/2004 | Roux et al. | |
| 6,741,981 B2 | 5/2004 | McGreevy | |
| 6,766,316 B2 | 7/2004 | Claudill et al. | |

(Continued)

FOREIGN PATENT DOCUMENTS

CN    1606004    4/2005

(Continued)

OTHER PUBLICATIONS

International Search Report dated Mar. 26, 2009 in International Application No. PCT/US2008/074935.

(Continued)

*Primary Examiner* — Sheree Brown
(74) *Attorney, Agent, or Firm* — Hope Baldauff Hartman, LLC

(57) ABSTRACT

Tools and techniques related to calculating valence of expressions within documents. These tools may provide methods that include receiving input documents for processing, and extracting expressions from the documents for valence analysis, with scope relationships occurring between terms contained in the expressions. The methods may calculate calculating valences of the expressions, based on the scope relationships between terms in the expressions.

16 Claims, 10 Drawing Sheets

U.S. PATENT DOCUMENTS

| | | | |
|---|---|---|---|
| 6,766,320 | B1 | 7/2004 | Wang et al. |
| 6,795,820 | B2 | 9/2004 | Barnett |
| 6,823,301 | B1 | 11/2004 | Ishikura |
| 6,842,730 | B1 | 1/2005 | Ejerhed et al. |
| 6,871,199 | B1 | 3/2005 | Binning et al. |
| 6,901,399 | B1 | 5/2005 | Corston |
| 6,947,923 | B2 | 9/2005 | Cha et al. |
| 6,968,332 | B1 | 11/2005 | Milic-Frayling |
| 7,016,828 | B1 | 3/2006 | Coyne et al. |
| 7,027,974 | B1 | 4/2006 | Busch et al. |
| 7,031,910 | B2 | 4/2006 | Eisele |
| 7,035,789 | B2 | 4/2006 | Abrego et al. |
| 7,117,437 | B2 | 10/2006 | Chen et al. |
| 7,120,574 | B2 | 10/2006 | Troyanova et al. |
| 7,171,349 | B1 | 1/2007 | Wakefield et al. |
| 7,184,950 | B2 | 2/2007 | Weise |
| 7,194,406 | B2 | 3/2007 | Ejerhed et al. |
| 7,225,121 | B2 | 5/2007 | Maxwell et al. |
| 7,260,519 | B2 | 8/2007 | Polanyi et al. |
| 7,269,594 | B2 | 9/2007 | Corston-Oliver |
| 7,319,951 | B2 | 1/2008 | Rising et al. |
| 7,346,490 | B2 | 3/2008 | Fass |
| 7,363,213 | B2 | 4/2008 | Polanyi et al. |
| 7,369,985 | B2 | 5/2008 | Polanyi et al. |
| 7,389,224 | B1 | 6/2008 | Elworthy |
| 7,398,201 | B2 | 7/2008 | Marchisio |
| 7,401,077 | B2 | 7/2008 | Bobrow et al. |
| 7,403,938 | B2 | 7/2008 | Harrison et al. |
| 7,424,420 | B2 | 9/2008 | Polanyi et al. |
| 7,593,845 | B2 | 9/2009 | Ramsey |
| 2002/0091684 | A1 | 7/2002 | Nomiyama et al. |
| 2003/0212546 | A1* | 11/2003 | Shaw .................. 704/9 |
| 2003/0212655 | A1* | 11/2003 | Volcani et al. .................. 707/1 |
| 2003/0233224 | A1 | 12/2003 | Marchisio et al. |
| 2004/0103090 | A1 | 5/2004 | Dogl et al. |
| 2004/0158454 | A1* | 8/2004 | Polanyi et al. .................. 704/4 |
| 2004/0243554 | A1 | 12/2004 | Broder et al. |
| 2004/0243556 | A1 | 12/2004 | Ferrucci et al. |
| 2004/0249795 | A1 | 12/2004 | Brockway |
| 2005/0043936 | A1 | 2/2005 | Corston-Oliver et al. |
| 2005/0065777 | A1 | 3/2005 | Dolan et al. |
| 2005/0071150 | A1 | 3/2005 | Nasypny |
| 2005/0108001 | A1 | 5/2005 | Aarskog |
| 2005/0108630 | A1 | 5/2005 | Wasson et al. |
| 2005/0182617 | A1 | 8/2005 | Reynar et al. |
| 2005/0182619 | A1 | 8/2005 | Azara |
| 2005/0267871 | A1 | 12/2005 | Marchisio et al. |
| 2006/0047632 | A1 | 3/2006 | Zhang |
| 2006/0156222 | A1 | 7/2006 | Chi |
| 2006/0161534 | A1 | 7/2006 | Carson, Jr. et al. |
| 2006/0184517 | A1 | 8/2006 | Anderson |
| 2006/0224582 | A1 | 10/2006 | Hogue |
| 2006/0271353 | A1 | 11/2006 | Berkan et al. |
| 2007/0073533 | A1 | 3/2007 | Thione et al. |
| 2007/0073745 | A1 | 3/2007 | Scott |
| 2007/0143098 | A1 | 6/2007 | Van der Berg |
| 2007/0156393 | A1 | 7/2007 | Todhunter et al. |
| 2008/0033982 | A1 | 2/2008 | Parikh |
| 2008/0086498 | A1 | 4/2008 | Sureka |
| 2008/0120279 | A1 | 5/2008 | Xue |
| 2008/0172628 | A1 | 7/2008 | Mehrotra |
| 2009/0271179 | A1 | 10/2009 | Marchisio et al. |
| 2010/0106706 | A1 | 4/2010 | Rorex |

FOREIGN PATENT DOCUMENTS

| | | |
|---|---|---|
| CN | 1658188 | 5/2005 |
| EP | 0597630 | 5/1994 |
| KR | 10-0546743 | 4/2005 |
| WO | WO 02/067145 | 8/2002 |

OTHER PUBLICATIONS

Bontcheva et al., "Shallow Methods for Named Entity Coreference Resolution," Proceedings of the TALN 2002 Workshop. Nancy, France. Jun. 24-27, 2002, 9 pages.

Ng, Vincent "Shallow Semantics for Coreference Resolution," Proceedings of the Twentieth International Joint Conference on Artificial Intelligence (IJCAI), Hyderabad, India, Jan. 2007, pp. 1689-1694.

Duchier, Denys,"Constraint Programming for Natural Language Processing", retrieved at <<http://citeseerx.ist.psu.edu/viewdoc/download;jsessionid=F70461C9F31A4EB405543CE688CCBF3D?doi=10.1.1.10.3152&rep=rep1&type=pdf>>, 2000. pp. 1-94.

"Powerset, Natural Language Search Engine", retrieved at <<http://googlesystem.blogspot.com/2007/02/powerset-natural-language-search-engine.html>>, Feb. 9, 2007. pp. 1-3.

Chien, Lee-Feng,"Fast and Quasi-Natural Language Search for Gigabytes of Chinese Texts", retrieved at <<http://delivery.acm.org/10.1145/220000/215345/p112-chien.pdf?key1=215345&key2=4667021221&coll=GUIDE&dl=GUIDE&CFID=2506110&CFTOKEN=93982745>>, 1995. pp. 1-9.

Kolodner Janet L.,"Indexing and Retrieval Strategies for Natural Language Fact Retrieval", retrieved z, retrieved at <<http://delivery.acm.org/10.1145/320000/319995/p434-kolodner.pdf?key1=319995&key2=1457021221&coll=GUIDE&dl=GUIDE&CFID=2551390&CFTOKEN=71366194>>, ACM Transactions on Database Systems, vol. 8, No. 3, Sep. 1983. pp. 1-31.

Thione, et al., "Applying Term Occurrence constraints in natural language search", U.S. Appl. No. 60/969,406, filed Aug. 31, 2007.

Walters, et al., "Flexible Ranking infrastructure for query execution", U.S. Appl. No. 60/969,410, filed Aug. 31, 2007.

Walters, et al., "Checkpointing of composable lazily-evaluated integrators in search", U.S. Appl. No. 60/969,417, filed Aug. 31, 2007.

Thione, et al., "Indexing of alias clusters for search", U.S. Appl. No. 60/969,426, filed Aug. 31, 2007.

Crouch, et al., "Aboutness identification and indexing", U.S. Appl. No. 60/969,434, filed Aug. 31, 2007.

Polanyi, et al., "Valence calculus for indexing with special reference to reported speech and thought", U.S. Appl. No. 60/969,442, filed Aug. 31, 2007.

Snow, et al., "Bucketized threshold for runtime pruning of senses/ranking", U.S. Appl. No. 60/969,447, filed Aug. 31, 2007.

Pell, et al., "Hierarchal probability-based weighting for hypernyms in word sense disambiguation", U.S. Appl. No. 60/969,451, filed Aug. 31, 2007.

Biewald, et al., "Priority-based ranking functions for informtion retrieval", U.S. Appl. No. 60/969,453, filed Aug. 31, 2007.

Pell, et al.,"Priority-based disjunctive retrieval", U.S. Appl. No. 60/969,457, filed Aug. 31, 2007.

Rayner, et al., "Semi-automatic example-based induction of semantic translation rules to support natural language search", U.S. Appl. No. 60/969,472, filed Aug. 31, 2007.

Thione, et al., "Semantically-based highlighting of search results", U.S. Appl. No. 60/969,478, filed Aug. 31, 2007.

Salvetti, et al., "Integration of coreference resolution in an ambiguity-sensitive natural language processing pipeline for a search platform", U.S. Appl. No. 60/969,483, filed Aug. 31, 2007.

Thione, et al.,"Fact-based indexing for natural language search", U.S. Appl. No. 60/969,486, filed Aug. 31, 2007.

Thione, et al., "Attribute-value mapping to map structural information about entities to ontologies", U.S. Appl. No. 60/969,488, filed Aug. 31, 2007.

Thione, et al., "Indexing and ranking role hierarchies search index", U.S. Appl. No. 60/969,490, filed Aug. 31, 2007.

Thione, et al., "Efficient posting layout for retrieval of terms in dominance hierarchies", U.S. Appl. No. 60/969,495, filed Aug. 31, 2007.

Salvetti, et al., "A system for browsing knowledge on the basis of semantic relations", U.S. Appl. No. 60/971,061, filed Sep. 10, 2007.

Polanyi, et al., "Contextual Valence Shifters", Retrieved at << http://www.kornshak.com/people/livia.polanyi/publications/SS403PolanyiL.pdf >>, 2004 AAAI Spring Symposium on Exploring Attitude and Affect in Text, Chapter X, Mar. 2004, pp. 1-10.

Computing Attitude and Affect in Text: Theory and Applications (2006), Shanahan, James G., Qu, Yan, (Eds.), Janyce Wiebe, Retrieved at << http://ebooks.ulb.tu-darmstadt.de/1355/ >>, Springer., Abstract.

Liu, Bing, "Opinions Extraction and Information Synthesis", Retrieved at << www.cs.uic.edu/~liub/teach/cs511-spring-06/CS511-opinion-synthesis.ppt >>, pp. 1-58.

International Search Report dated Apr. 29, 2009 in International Application No. PCT. No. PCT/US08/074981.

U.S. Official Action dated Jan. 3, 2011 in U.S. Appl. No. 12/201,596.

Jun et al., "Keyfact-Based Information Retrieval System", TaeJon, Korea, downloaded Mar. 18, 2011 from http://www.dl.slis.tsukuba.ac.jp/ISDL97/proceedings/miseon/miseon.html, 6 pages.

Tablan et al., "A Natural Language Query Interface to Structured Information", downloaded Mar. 18, 2011 from http://www.eswc2008.org/final-pdfs-for-web-site/onl-2.pdf, 15 pages.

U.S. Official Action dated Jun. 22, 2011 in U.S. Appl. No. 12/201,596.

International Search Report dated Mar. 31, 2009 in International Application No. PCT/US08/074938.

International Search Report dated Jan. 23, 2009 in International Application No. PCT/US08/074978.

International Search Report dated Mar. 31, 2009 in International Application No. PCT/US08/074984.

International Search Report dated Mar. 31, 2009 in International Application No. PCT/US08/074987.

European Search Report dated Oct. 5, 2011 in European Application No. 08799054.5.

U.S. Official Action dated Mar. 17, 2011in U.S. Appl. No. 12/201,504.

U.S. Official Action dated Oct. 12, 2011 in U.S. Appl. No. 12/201,504.

U.S. Official Action dated Jan. 25, 2011 in U.S. Appl. No. 12/201,675.

U.S. Official Action dated Apr. 14, 2011 in U.S. Appl. No. 12/201,675.

U.S. Official Action dated Oct. 3, 2011 in U.S. Appl. No. 12/201,675.

U.S. Official Action dated Mar. 15, 2011 in U.S. Appl. No. 12/201,721.

U.S. Official Action dated Oct. 26, 2011 in U.S. Appl. No. 12/201,721.

U.S. Official Action dated Dec. 23, 2010 in U.S. Appl. No. 12/201,978.

U.S. Official Action dated Jun. 7, 2011 in U.S. Appl. No. 12/201,978.

Agichtein, et al., "Snowball: Extracting Relations from Large Plain-Text Collections," Dec. 1999, Columbia University Computer Science Dept. Technical Report CUCS-033-99, 13 pp.

Alesso, "Semantic Search Methods," downloaded Aug. 28, 2008 from http://microsoft.apress.com/asptodayarchive173985/semantic-search-methods, 14 pages.

Araghi, "Users Satisfaction through Better Indexing," 2005, *Cataloging & Classification Quarterly*, 40(2): 5-12. 9 pp.

CS474 Intro to Natural Language Processing: Question Answering, downloaded Dec. 12, 2011 from http://www.cs.cornell.edu/courses/cs474/2005fa/Handouts/advanced-qa.pdf, 8 pgs.

Debrauwer et al., "Semantic Searching and Text Analysis with Distinguo®," downloaded Dec. 12, 2011 from http://www.ultralingua.com/ul/en/dox/Distinguo-White-Paper.pdf, 6 pp.

Hakia—Meaning-based Search Engine for a Better Search, downloaded Aug. 28, 2008 from http://www.techiequest.com/hakia-meaning-based-search-engine-for-a-better-search/, 8 pgs.

Han et al, "A Study on the Conceptual Modeling and Implementation of a Semantic Search System," Mar. 2008, *Korea Intelligent Information Systems Society*, 14(1): 67-84.

Huibers, "Towards an Axiomatic Aboutness Theory for Information Retrieval," 1998, Information Retrieval: Uncertainty and Logics—Advanced Models for the Representation and Retrieval of Information. Kluwer Academic Publishers, 7 pp.

Hussam et al., "Semantic Highlighting on the WWW: Educational Implications," Nov. 1998, *Proceedings of the WebNet 98 World Conference on the WWW, Internet and Intranet*, 6 pp.

Hutchins, "On the problem of 'Aboutness' in Document Analysis," Apr. 1977, *Journal of Informatics*, 1(1): 17-35. 16 pp.

Kang et al., "Document Indexing: A Concept-Based Approach to Term Weight Estimation," 2005, *Information Processing and Management*, 41:1065-1080, 16 pp.

Kapoor et al., "STAR: A System for Tuple and Attribute Ranking of Query Answer" Apr. 15, 2007, *International Conference on Data Engineering 2007*, 2 pp.

Lo et al., "Using Semantic Relations with World Knowledge for Question Answering," 2006, *Proceedings of the 15th Text Retrieval Conference (TREC 15)*, 6 pp.

Manegold et al., A multi-query optimizer for Monet, Jan. 31, 2000, Information Systems, 18 pp.

Moens et al., "Measuring Aboutness of an Entity in a Text," 2006, *Proceedings of the 1st Workshop on Graph Based Methods for Natural Language Processing*, 4 pp.

Seki, Y., "Answer Extraction System by Question Type from Query Biased Summary for Newspaper Articles," Sep. 2001-Oct. 2002, *Proceedings of the 3rd NTCIR Workshop*, 8 pp.

Sieg et al., "Learning Ontology-based User Profiles: A Semantic Approach to Personalized Web Search," Nov. 2007, *IEEE Intelligent Informatics Bulletin*, 8(1): 7-18, 12pp.

Smeaton et al., "Experiments on Using Semantic Distances between Words in Images Caption Retrieval," Aug. 1996, *Proceedings of the 19th Annual International ACM SIGIR Conference on Research and Development in Information Retrieval*, 8 pp.

Srihari et al., "Information Extraction Supported Question Answering," Oct. 15, 1999, downloaded from http://handle.dtic.mil/100.2/ADA460042, 12 pp.

Taibi, et al., "A Semantic Search Engine for Learning Resources," 2005, *Recent Research Developments in Learning Technologies*, http://www.formatex.org/micte2005/349.pdf, 5 pp.

Vintar et al., "Semantic Relations in Concept-Based Cross-Language Medical Information Retrieval," Sep. 22, 2003, *Proceedings of the ECML / PKDD Workshop on Adaptive Text Extraction and Mining*, 9 pp.

U.S. Official Action dated Jan. 4, 2012 in U.S. Appl. No. 12/201,978.

U.S. Notice of Allowance dated Apr. 5, 2012 in U.S. Appl. No. 12/201,504.

U.S. Notice of Allowance dated May 14, 2012 in U.S. Appl. No. 12/201,721.

\* cited by examiner

CALCULATING VALENCE OF EXPRESSIONS WITHIN DOCUMENTS FOR SEARCHING A DOCUMENT INDEX

CROSS-REFERENCE TO PRIORITY APPLICATION

This application claims the benefit of the filing date of: U.S. Provisional Application Ser. No. 60/969,442, filed on 31 Aug. 2007 and entitled "Valence Calculus for Indexing with Special Reference to Reported Speech and Thought"; and U.S. Provisional Application Ser. No. 60/969,486, filed on 31 Aug. 2007 and entitled "Fact-Based Indexing For Natural Language Search", to the fullest extent permitted under 35 U.S.C. §119(e). This application also incorporates the contents of these Provisional Applications by this reference, as if those contents were included verbatim herein.

BACKGROUND

An increasing quantity of documents and other textual subject matter is becoming available over wide-area global communications networks. As more and more users are accessing these documents, techniques for searching these documents online are continuing to develop.

SUMMARY

Tools and techniques related to calculating valence of expressions within documents. These tools may provide methods that include receiving input documents for processing, and extracting expressions from the documents for valence analysis, with scope relationships occurring between terms contained in the expressions. The methods may calculate calculating valences of the expressions, based on the scope relationships between terms in the expressions.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
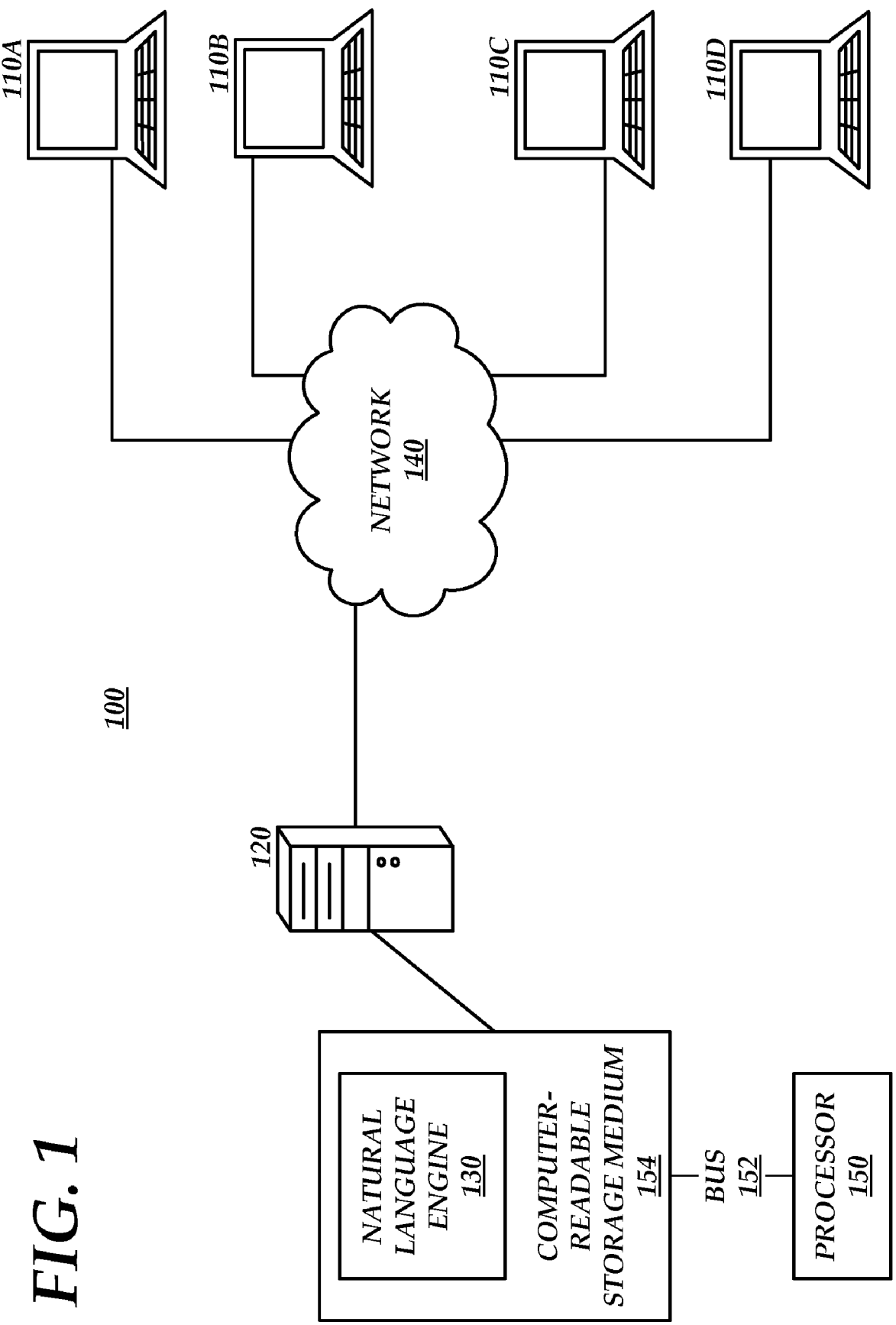
FIG. 1 is a block diagram illustrating overall systems or operating environments for calculating valence of expressions within documents.

The following detailed description is directed to technologies for calculating valence of expressions within documents. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for calculating valence of expressions within documents will be described.

FIG. 1 is a block diagram illustrating overall systems or operating environments for calculating valence of expressions within documents. Turning now to FIG. 1 in more detail, details will be provided regarding an illustrative operating environment for the implementations presented herein. In particular, a network architecture diagram 100 illustrates an information search system according to aspects of an embodiment presented herein. Client computers 110A-110D can interface through a network 140 to a server 120 to obtain information associated with a natural language engine 130. While four client computers 110A-110D are illustrated, it should be appreciated that any number of client computers 110A-110D may be in use. The client computers 110A-110D may be geographically distributed across a network 140, collocated, or any combination thereof. While a single server 120 is illustrated, it should be appreciated that the functionality of the server 120 may be distributed over any number of multiple servers 120. Such multiple servers 120 may be collocated, geographically distributed across a network 140, or any combination thereof.

According to one or more embodiments, the natural language engine 130 may support search engine functionality. In a search engine scenario, a user query may be issued from a client computer 110A-110D through the network 140 and on to the server 120. The user query may be in a natural language format. At the server, the natural language engine 130 may processes the natural language query to support a search based upon syntax and semantics extracted from the natural language query. Results of such a search may be provided from the server 120 through the network 140 back to the client computers 110A-110D.

One or more search indexes may be stored at, or in association with, the server 120. Information in a search index may be populated from a set of source information, or a corpus. For example, in a web search implementation, content may be collected and indexed from various web sites on various web servers (not illustrated) across the network 140. Such collection and indexing may be performed by software executing on the server 120, or on another computer (not illustrated). The collection may be performed by web crawlers or spider applications. The natural language engine 130 may be applied to the collected information such that natural language content collected from the corpus may be indexed based on syntax and semantics extracted by the natural language engine 130. Indexing and searching is discussed in further detail with respect to FIG. 2.

The client computers 110A-110D may act as terminal clients, hypertext browser clients, graphical display clients, or other networked clients to the server 120. For example, a web browser application at the client computers 110A-110D may support interfacing with a web server application at the server 120. Such a browser may use controls, plug-ins, or applets to support interfacing to the server 120. The client computers 110A-110D can also use other customized programs, applications, or modules to interface with the server 120. The client computers 110A-110D can be desktop computers, laptops, handhelds, mobile terminals, mobile telephones, television set-top boxes, kiosks, servers, terminals, thin-clients, or any other computerized devices.

The network 140 may be any communications network capable of supporting communications between the client computers 110A-110D and the server 120. The network 140 may be wired, wireless, optical, radio, packet switched, circuit switched, or any combination thereof. The network 140 may use any topology and links of the network may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, an internet, the Internet, the World Wide Web, a LAN, a WAN, a MAN, or any other network for interconnection computers systems.

It should be appreciated that, in addition to the illustrated network environment, the natural language engine 130 can be operated locally. For example, a server 120 and a client computer 110A-110D may be combined onto a single computing device. Such a combined system can support search indexes stored locally or remotely.

Turning to the server 120 in more detail, these servers may include one or more processors 150, which may have a particular type or architecture, chosen as appropriate for particular implementations. The processors 150 may couple to one or more bus systems 152 chosen for compatibility with the processors 150.

The server 120 may also include one or more instances of computer-readable storage media 154, which couple to the bus systems 152. The bus systems may enable the processors 150 to read code and/or data to and/or from the computer-readable storage media 154. The media 154 may represent storage elements implemented using any suitable technology, including but not limited to semiconductors, magnetic materials, optics, or the like. The media 154 may include memory components, whether classified as RAM, ROM, flash, or other types, and may also represent hard disk drives.

The storage media 154 may include one or more modules of software instructions that, when loaded into the processor 150 and executed, cause the server 120 to perform various tools and techniques relating to calculating valence of expressions within documents. Examples of these modules may include the natural language engine 130, along with other software components as well.

Figure 2:
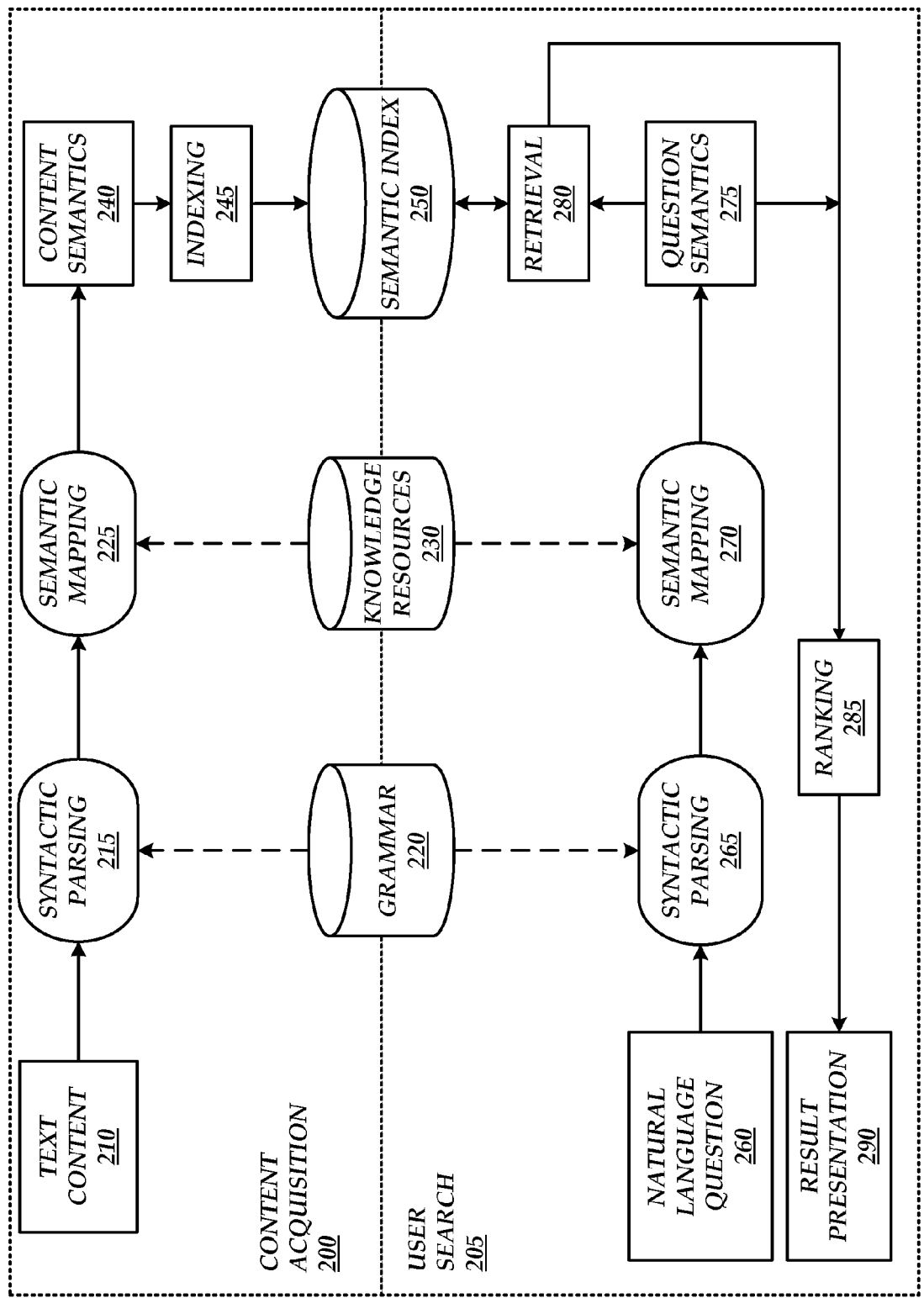
FIG. 2 is a block diagram illustrating processes or functions that a natural language engine may perform to calculate valence of expressions within documents.

FIG. 2 illustrates processes or functions that a natural language engine (e.g., 130 in FIG. 1) may perform to calculate valence of expressions within documents. Referring now to FIG. 2 in more detail, a functional block diagram illustrates various components of a natural language engine 130 according to one exemplary embodiment. As discussed above, the natural language engine 130 can support information searches. In order to support such searches, a content acquisition process 200 is performed. Operations related to content acquisition 200 extract information from documents provided as text content 210. This information can be stored in a semantic index 250 that can be used for searching. Operations related to a user search 205 can support processing of a user entered search query. The user query can take the form of a natural language question 260. The natural language engine 130 can analyze the user input to translate a query into a representation to be compared with information represented within the semantic index 250. The content and structuring of information in the semantic index 250 can support rapid matching and retrieval of documents, or portions of documents, that are relevant to the meaning of the query or natural language question 260.

The text content 210 may comprise documents in a very general sense. Examples of such documents can include web pages, textual documents, scanned documents, databases, information listings, other Internet content, or any other information source. This text content 210 can provide a corpus of information to be searched. Processing the text content 210 can occur in two stages as syntactic parsing 215 and semantic mapping 225. Preliminary language processing steps may occur before, or at the beginning of parsing 215. For example, the text content 210 may be separated at sentence boundaries. Proper nouns may be identified as the names of particular people, places, objects or events. Also, the grammatical properties of meaningful word endings may be determined. For example, in English, a noun ending in "s" is likely to be a plural noun, while a verb ending in "s" may be a third person singular verb.

Parsing 215 may be performed by a syntactic analysis system, such as the Xerox Linguistic Environment (XLE), provided here only as a general example, but not to limit possible implementations of this description. The parser 215 can convert sentences to representations that make explicit the syntactic relations among words. The parser 215 can apply a grammar 220 associated with the specific language in use. For example, the parser 215 can apply a grammar 220 for English. The grammar 220 may be formalized, for example, as a lexical functional grammar (LFG) or other suitable parsing mechanism like those based on Head-Driven Phrase Structure Grammar (HPSG), Combinatory categorical grammar (CCG), Probabilistic Context-free Grammar (PCFG) or any other grammar formalism. In some cases, implementations of this description may perform semantic analysis without also performing syntactic analysis. The valence analysis techniques described further below may operate based on scope relationships, without relying on syntactical relationships. The grammar 220 can specify possible ways for constructing meaningful sentences in a given language. The parser 215 may apply the rules of the grammar 220 to the strings of the text content 210.

A grammar 220 may be provided for various languages. For example, languages for which LFG grammars have been created include English, French, German, Chinese, and Japanese. Other grammars may be provided as well. A grammar 220 may be developed by manual acquisition where grammatical rules are defined by a linguist or dictionary writer. Alternatively, machine learning acquisition can involve the automated observation and analysis of many examples of text from a large corpus to automatically determine grammatical rules. A combination of manual definition and machine learning may be also be used in acquiring the rules of a grammar 220.

The parser 215 can apply the grammar 220 to the text content 210 to determine the syntactic structure. In the case of LFG based parsing, the syntactic structures may include constituent structures (c-structures) and functional structures (f-structures). The c-structure can represent a hierarchy of constituent phrases and words. The f-structure can encode roles and relationships between the various constituents of the c-structure. The f-structure can also represent information derived from the forms of the words. For example, the plurality of a noun or the tense of a verb may be specified in the f-structure.

During a semantic mapping process 225 that follows the parsing process 215, information can be extracted from the syntactic structures and combined with information about the meanings of the words in the sentence. A semantic map or semantic representation of a sentence can be provided as content semantics 240. Semantic mapping 225 can augment the syntactic relationships provided by the parser 215 with conceptual properties of individual words. The results can be transformed into representations of the meaning of sentences from the text content 210. Semantic mapping 225 can determine roles played by words in a sentence. For example, the subject performing an action, something used to carry out the action, or something being affected by the action. For the purposes of search indexing, words can be stored in a semantic index 250 along with their roles. Thus, retrieval from the semantic index 250 can depend not merely on a word in isolation, but also on the meaning of the word in the sentences in which it appears within the text content 210. Semantic mapping 225 can support disambiguation of terms, determination of antecedent relationships, and expansion of terms by synonym, hypernym, or hyponym.

Semantic mapping 225 can apply knowledge resources 230 as rules and techniques for extracting semantics from sentences. The knowledge resources can be acquired through both manual definition and machine learning, as discussed with respect to acquisition of grammars 220. The semantic mapping 225 process can provide content semantics 240 in a semantic extensible markup language (semantic XML or semxml) representation or any suitable representation language (e.g., expressions written in the PROLOG, LISP, JSON, YAML, or other languages). Content semantics 240 can specify roles played by words in the sentences of the text content 210. The content semantics 240 can be provided to an indexing process 245.

An index can support representing a large corpus of information so that the locations of words and phrases can be rapidly identified within the index. A traditional search engine may use keywords as search terms such that the index maps from keywords specified by a user to articles or documents where those keywords appear. The semantic index 250 can represent the semantic meanings of words in addition to the words themselves. Semantic relationships can be assigned to words during both content acquisition 200 and user search 205. Queries against the semantic index 250 can be based on not only words, but words in specific roles. The roles are those played by the word in the sentence or phrase as stored in the semantic index 250. The semantic index 250 can be considered an inverted index that is a rapidly searchable database whose entries are semantic words (i.e. word in a given role) with pointers to the documents, or web pages, on which those words occur. The semantic index 250 can support hybrid indexing. Such hybrid indexing can combine features and functions of both keyword indexing and semantic indexing.

User entry of queries can be supported in the form of natural language questions 260. The query can be analyzed through a natural language pipeline similar, or identical, to that used in content acquisition 200. That is, the natural language question 260 can be processed by a parser 265 to extract syntactic structure. Following syntactic parsing 265, the natural language question 260 can be processed for semantic mapping 270. The semantic mapping 270 can provide question semantics 275 to be used in a retrieval process 280 against the semantic index 250 as discussed above. The retrieval process 280 can support hybrid index queries where both keyword index retrieval and semantic index retrieval may be provided alone or in combination.

In response to a user query, results of retrieval 280 from the semantic index 250 along with the question semantics 275 can inform a ranking process 285. Ranking can leverage both keyword and semantic information. During ranking 285, the results obtained by retrieval 280 can be ordered by various metrics in an attempt to place the most desirable results closer to the top of the retrieved information to be provided to the user as a result of presentation 290.

Figure 3:
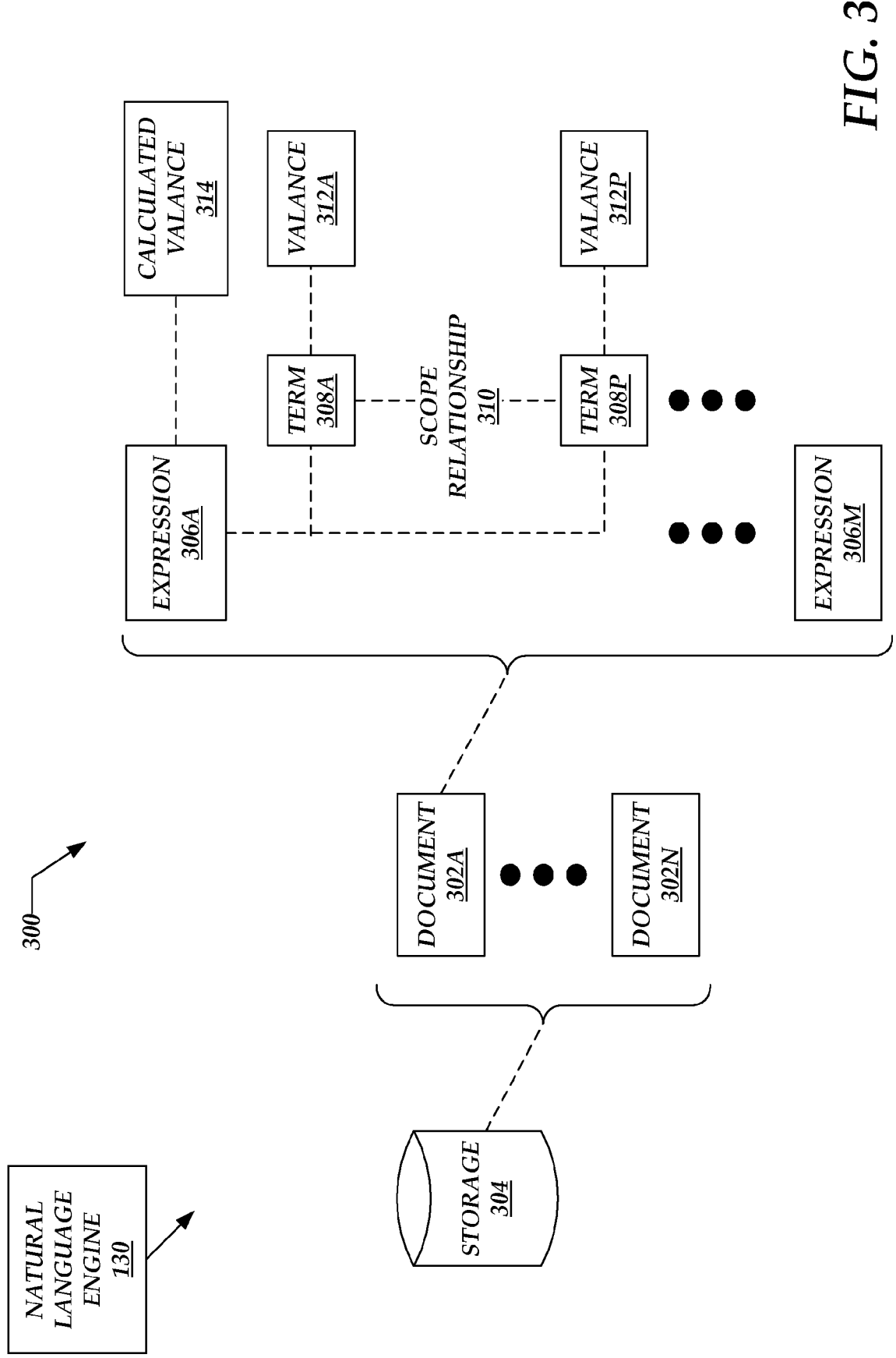
FIG. 3 is a block diagram illustrating data structures and hierarchies with which the natural language engine may interact in calculating valence of expressions within documents.

FIG. 3 illustrates data structures and hierarchies, denoted generally at 300, with which the natural language engine 130 may interact in calculating valence of expressions within documents. For example, the natural language engine 130 may assess, calculate, and index for search the attitudes of an author, speaker, or other attitude holder towards entities, situations, events or other texts represented in one or more texts or documents 302*a* and 302*n* (collectively, documents 302). Storage elements 304 may contain any number of the documents 302, with the two documents 302*a* and 302*n* being provided only for example. As described in further detail below, the natural language engine at 130 may also index those attitudes in an ambiguity-enabled index, to facilitate subsequent search and analysis based on these attitudes.

Turning to an example document 302*a*, this document may contain any number of expressions 306*a* and 306*m* (collectively, expressions 306). These expressions 306 may be organized into discourse-level structures, paragraphs, sentences, lists or fragmentary utterances, or the like as appropriate in particular implementations. These expressions 306 may include particular terms 308*a* and 308*p* (collectively, terms 308). Some of these terms 308 may be related semantically to one other. More specifically, a given term 308*p* may be within the scope of another given term 308*a*, such that the term 308*a* alters or controls the meaning of the term 308*p*. FIG. 3 represents scope relationships generally at 310, and the role of the scope relationships 310 as detailed further in the following drawings.

The natural language engine 130 may identify the valence of the terms 308 in the document 302*a*, considered against a list of such terms annotated for positive, negative, and neutral attitudes. For ease of description, but not to limit possible implementations, the term "valence" as used herein refers to positive, negative, or neutral semantic dimensions conveyed by a given term. For example, the term 308a may be associated with a corresponding valence 312a, and the term 308p may be associated with a corresponding valence 312p (collectively, valence 312). These valences 312 may be stored, for example, in a pre-existing lexicon (not shown in FIG. 3).

The natural language engine 130 may calculate a valence 314, based at least in part on the scope relationships 310 between various terms 308, and the valences 312 of these terms 308. In turn, the natural language engine 130 may associate the valences 312 of the terms 308 with valences 314 of basic predications or facts in an index. This index may be created after adjusting the base valences 312, as taken from the lexicon, with other relevant information obtained during linguistic processing.

When people use natural language to communicate with one another, they often express positive or negative opinions or judgments of persons, objects, situations, activities and events. Most commonly, negative sentiments are conveyed, at least partially, through the use of terms with a negative meaning or connotation while positive sentiments are communicated using positive terms. However, people may also express negative sentiments with positive terms, by using more complex rhetorical strategies (e.g., "damning with faint praise", also known as litotes), or by expressing positive sentiments with negative terms (e.g., "He's a brat sometimes." said affectionately about a grandchild). Thus, the sentence "Going to the beach in the summer is a fun experience." expresses a positive attitude toward SUMMER BEACH GOING. Humans may reach this interpretation because the word fun has a positive connotation, and the syntactic structure of the sentence stipulates that fun be interpreted as describing a property of that BEACH GOING activity.

Terms that convey positive or negative valence can be nouns, verbs, adverbs, adjectives or interjections. In some cases, particularly in interactive spoken language, connectives such as "but," "because," or occasionally prepositions can be used to convey valence. In some cases, prosody, phrasing and pausing may also be used to communicate attitude towards content.

The basic valence of a term, however, may not determine the final interpretation of attitude of a given speaker or author. For example, "Going to the beach in the summer is not a fun activity," may communicate a negative attitude towards BEACH GOING, which attitude results from the application of the negative term not to the basic predication or fact (in this example, BEACH GOING as a fun activity).

This description defines "sentiment" as the subjective attitude A of some agent, S (i.e., normally the speaker/writer/etc.) about or toward a target entity/event/state of affairs E (i.e., the thing spoken/written/etc.). While this description may refer to the attitude-holding agent, or to the agent producing the linguistic expression under consideration, as a Speaker or Author, this convention is only for clarity and convenience in providing this description. It is noted that, in some expressions, a speaker may or may not be actually "speaking". For example, in the example expression John hates cauliflower, John as S holds a negative attitude towards cauliflower.

Figure 4:
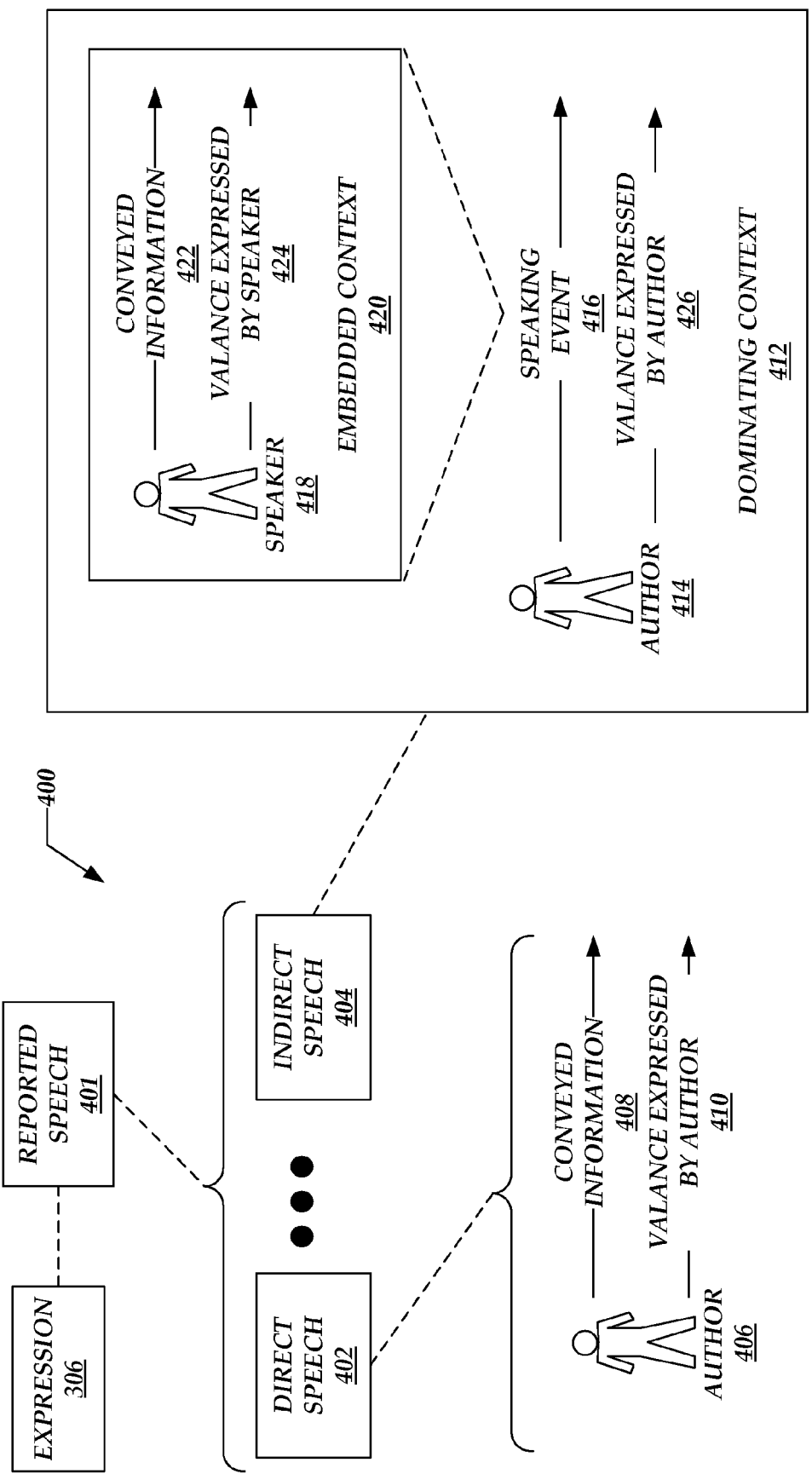
FIG. 4 is a combined block and flow diagram illustrating examples of direct speech and reported speech.

FIG. 4 illustrates examples, denoted generally at 400, of direct speech and reported speech. A given expression (e.g., 306 as carried forward in FIG. 3) may include instances of reported speech, denoted generally at 401. Reported speech instances 401 may include direct speech, denoted generally at 402, as well as instances of indirect speech, denoted generally at 404. As used in this description, the term "reported speech" is understood to refer generally to either of the direct or indirect speech scenarios described below, with direct or indirect speech providing more specific non-limiting examples of reported speech. In addition to reported speech scenarios, implementations of this description may also apply the techniques described for reported speech to analyzing reported thoughts, reported beliefs, reported opinions, reported attitudes, and the like.

Turning to the direct speech scenario 402 in more detail, a given author 406 may convey the information 408. In some direct speech scenarios, the author 406 may also express an attitude, feeling, or some level of sentiment toward the conveyed information 408. FIG. 4 represents this expressed attitude or sentiment as valence 410.

Some natural language applications may automatically determine or calculate the valence expressed by the author of a spoken or written text towards the information being described. In some direct speech cases, determining the valence expressed by the author may be relatively straightforward. However, determining the valence of indirect speech events may be more challenging. More specifically, indirect speech scenarios 404 may involve two contexts.

In a dominating context 412, an author 414 reports on a speaking event 416. For example, the author 414 may report what another speaker 418 said, thought, or felt.

In an embedded context 420, a speaker 418 may express or convey information 422, which represents what was said, thought, or felt. In some cases, the speaker 418 may manifest an attitude, sentiment, or feeling, expressed with a given valence 424, towards the conveyed information 422. This valence 424 may be reflected by how the conveyed information 422 is reported. More specifically, assuming that the author 414 reports on the conveyed information 422 through the speaking event 416, the valence 424 may be expressed in the choice of terms or language chosen by the author 414 in so reporting. In particular, the Author's attitude may be manifest in the choice of speech verb used to describe the Speaker's expression.

In indirect speech contexts, it may be valuable to identify the valence expressed by the conveyer of the speech act. More specifically, the author 414 may express valence 426, which may be directed toward the speaker 418 and/or the conveyed information 422, as described in further detail below.

Valence identification and analysis may be applied in opinion mining, summarization, information fusion, machine translation, speech understanding and synthesis, natural language generation and dialogue, and in any other natural language processing (NLP) application in which any user or process could be interested in understanding any aspect of the attitude being expressed as well as search. To facilitate the present description, but not to limit possible implementations, this discussion addresses searched scenarios more specifically. More specifically, this description provides various tools and techniques related to computational methods for assigning valences, suitable for calculating these attitudes, sentiments, or feelings.

In the field of natural language processing, methods may estimate whether a sentence or document conveys positive or negative information. These methods may involve the manipulation of information stored in a lexicon of terms marked as positive, negative or neutral. In some cases, these terms may be single words. In other cases, these terms may be interjections (e.g., "Uh oh"), which may not be considered as linguistic per se. These terms may also include phrases that contain more than one term.

In illustrative techniques, a text may be scanned for positive or negative terms that occur in a lexicon, counting how many terms of each valence are present in the text present.

The text is assumed to convey a positive or negative opinion based on whichever count is larger. Somewhat more sophisticated methods have been proposed that involve more complex valence computation. Using such methods, the valence of one term can be influenced by the presence of other linguistic phenomena in the same context. While many terms only carry their own valence, other terms may neutralize or flip the valence of another term. Other terms may invert the valence of other terms in all contexts. For example, "not" switches the valence of terms in its arguments: "not" applied to "pretty" in "The flower was not pretty" would switch the valence of the sentence from positive to negative. To take a simple calculating framework as an example, this would be the effect of assigning a term marked positive in the lexicon a score of +1 (e.g., "pretty"), and marking the term "not" as a valence switcher. Combining the terms would net a score of 0, indicating that the sentence communicates a neutral sentiment. However, because intuitively "The flower was not pretty" expresses a negative sentiment, rather than a neutral sentiment, more sophisticated tools and techniques described in this discussion may combine valences more appropriately, providing an advancement over simple counting methods employed previously.

Simple counting methods may fail particularly in cases of indirect speech. For example, considering the example expression "John complained that Mary, his lovely sister, was bothering him," previous techniques may properly assign a negative overall valence to this expression, assuming that the lexicon marks the terms "complain" (−1) and "bother" (−1) as negative and also marks the term "lovely" (+1) as positive. Another example expression, "John complained that Mary, his lovely and popular older sister, was bothering him," may receive a neutral interpretation under previous methods, assuming that the lexicon marks the term "popular" as positive. However, humans would understand this latter sentence to express a negative overall sentiment. In another example, humans would understand the sentence "John complained that his sister Mary is both popular and a fantastic student" to express a negative overall sentiment. However, under a one-term-one-vote accounting scheme, the lexicon may mark both of the terms "popular" and "fantastic" as positive (+2), and may mark the term "complain" as negative (−1), resulting (incorrectly) in a positive overall sentiment.

Figure 5:
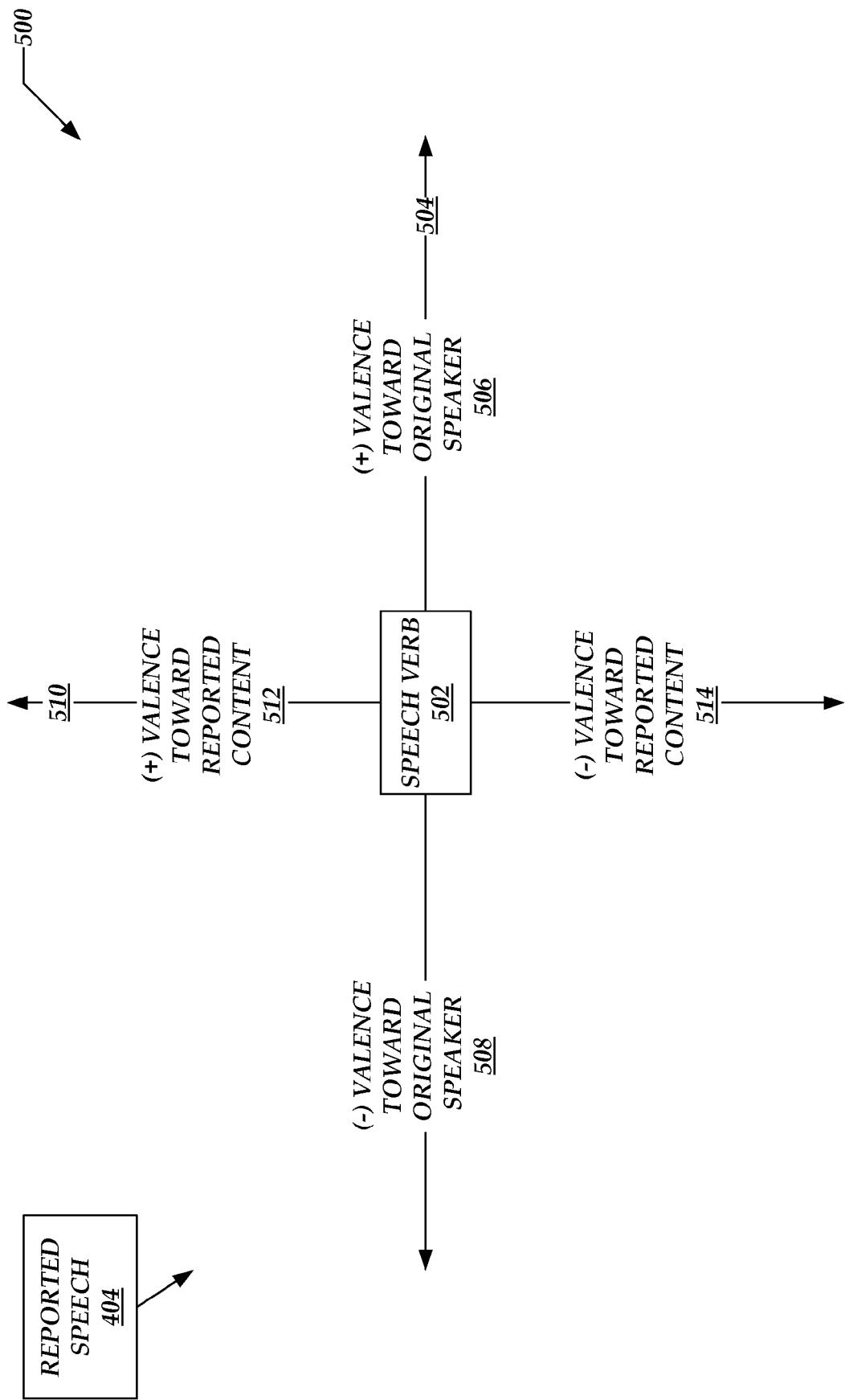
FIG. 5 is a block diagram illustrating relationships that indicate how valences may vary along more than one dimension, in a reported speech scenario.

FIG. 5 illustrates relationships, denoted generally at 500, indicating how valences may vary along more than one dimension, in an indirect speech scenario. For example, authors (e.g., 414 in FIG. 4) may employ a variety of different speech verbs 502 to report speech events. These speech verbs 502 may differ in their valence along more than one dimension. For example, along a first dimension 504, certain speech verbs 502 may convey a positive valence toward the original speaker (e.g., 418 FIG. 4), as represented generally at 506. Other speech verbs 502 may convey a negative valence toward the original speaker, as represented generally at 508. Similarly, along another dimension 510, certain speech verbs 502 may convey a positive valence toward the reported content, as represented generally at 512. Other speech verbs 502 may convey a negative valence toward the reported content, as represented generally at 514.

These multiple dimensions (e.g., 504 and 510) along which speech verbs may vary in valence may increase the complexity of analyzing and computationally treating indirect speech. For example, a speech verb 502 that conveys negative valence, such as complain, marks negative valence towards the content reported, and a neutral stance towards the Speaker. A closely related verb, whine, on the other hand, encodes negativity on the Author's part towards both the content and towards the Speaker. another Speech verb, drone on, reflects a negative attitude on the Author's part towards the manner in which the Speaker spoke—and less directly about the Speaker—but is neutral regarding the Speaker's attitude towards what is being said. For example, a given Speaker may drone on about how great his vacation was— every single detail of his vacation.

Another class of speech verbs, such as haggle, reveals the valence of the Author's attitude toward the speaking situation, but may not signal that the Speaker was negative towards the topics under discussion. The tools and techniques described herein may account for these various distinctions when assigning valence. In the case of "John complained that his sister Mary is both popular and a fantastic student", the Author establishes the speaking event as a complaint. the outer (or dominating) context may carry more weight in the estimation of valence, as compared to the specifics of the object, person, event, activity, situation etc. described within the indirect or embedded context. In this example, the embedded context conveys the positive attributes of JOHN'S SISTER.

As another example, consider the sentence "John complained that Mary, his lovely sister, was a murch." where the term "murch" is not in the lexicon. In this scenario, the sentence would be assigned a neutral valence by counting the negative valence of "complain" as −1 and the positive valence of "lovely" as +1. Lacking any information about "murch", this term is assumed to carry carries a neutral valence of 0. However, again, relying on intuition as users of language, humans would recognize that "John complained that Mary, his lovely sister, was a murch." describes a negative situation, one in which John is expressing negative sentiments about his sister. Thus, human users would expect the entire statement to be interpreted as negative. The contextual valence assignment methods described herein can assign a valence to an unknown word, within the scope of an indirect speech operator having known valence with a relatively high degree of confidence, especially if other terms with scope over the unknown word also carry a known valence. In these cases, lacking any other information about the unknown word, the unknown word may inherit valence from other items within the scope of an expression whose valence is known.

Traditionally, the attitude of a text may be calculated by identifying all the words of a text that express non-neutral sentiment, and combining these words in some way to calculate an overall attitude. As described above, simple counting may exhibit problems when used to try to establish overall valence of a text. While in some cases, simple counting schemes or other brute force approaches may be sufficient to establish valence of an entire document, these methods. The tools and techniques described here extend and generalize various valence combination methods, demonstrating that valence shifting may be treated and analyzed as a particular case of semantic scope phenomena. In particular, this description provides tools and techniques for performing calculations to improve the assignment of valence in indirect speech and thought contexts.

This description also extends the domain of applicability of valence shifting methods to the domain of search. In particular, this description provides methods that may enable users to search conveniently or naturally for information about what a given individual said. More generally, these methods may enable users to access information that is differentiated according to its factive status. For example, was the information sought a thought, a feeling, an impression, something someone said, something being presented as a fact? Given an indexing system that permits the retrieval of information on the basis of its factivity, users may pose queries about the beliefs and attitudes held by persons or organizations of interest. Queries of the type "What do doctor's think about Medicare reform?" or "Does President Bush like Tausher's bill on Iraq?" could then retrieve relevant documents. Furthermore, the valence of each "fact" is also influenced by its occurrence in a Speech or Thought context, as the "murch" example above demonstrates.

Scope Phenomena

For the purposes of this description, valence shifting for attitude determination may be treated as a scope phenomenon. Furthermore, valence shifting may operate as a scope phenomenon within a paragraph, sentence, phrase, or fragment, within an entire document, part of a document, or, within a collection of documents.

Turning in more detail to the concept of scope as used in this description, for any word or phrase, the part of a sentence over which it has a semantic effect, the part it changes the meaning of, is called its scope. Scope is a semantic phenomenon that is informed by syntactic structure at the sentence level and at lower levels. At the levels of text, document, or paragraph, discourse structure may inform the scope. The concept of context, as used herein, may be understood as the dual of scope, with the concepts of context and scope being expressed from different perspectives.

As examples of scope phenomena, an adjective may restrict or change the meaning of the noun that it modifies. An example of restriction by an adjective is given by a red house: the adjective red restricts the meaning of house to make the meaning of houses-that-are-of-the-color-red. An example of change by an adjective is given by fake gold: the adjective fake changes the meaning of gold, denoting things made of the mineral gold, to things-made-of-something-that-looks-like-gold-but-is-not.

Scope relates generally to the recursive nature of human language. When constructing sentences, parts of the sentence (e.g., words, phrases, and other constructs) may be combined to form larger phrases, sentences, and texts. The meanings of the different parts of a sentence may combine to define the meaning of the whole sentence, through one part of the sentence having scope over other parts of the sentence. This scope phenomenon may also operate at the discourse level. However, for purposes of illustration, but not to limit implementations, this description discusses scope within a sentence.

Implementations of this description may establish or determine semantic scope different possible techniques. For example, scope may be determined using statistical methods. In addition, scope may be determined by analyzing surface punctuation, such as quotation marks, grouping constructs (e.g., parentheses, brackets, or similar operators), font characteristics (e.g., font sizes, types, colors, and the like), conventions used to mark groups or lists (e.g., bulleting, indentations, and the like).

Other examples of scope, in addition to the cases of adjectives described above, may include but are not limited to:
Adverbs and Adverbial Phrases
Modify non-nouns the way adjectives modify nouns.
Really red house
  Really modifies red to strengthen it
John ran fast
  Fast restricts run to speedy cases
Quantifying Expressions (Adverbial Phrases or Determiners)
On Sep. 14, 1992 Susan was elected to the board.
  On Sep. 14, 1992 restricts it scope to have occurred at the date it denoted.

Every time John complains about the soup.
  John complains about the soup is modified to apply at all times, rather than at some unspecified time.
Regularly, John likes the potatoes
  Quantifiers can be adverbs
Every inhabitant got a zucchini
  In this slightly more complex example, every has scope over the rest of the sentences, stating an inhabitant got a zucchini to be true for each inhabitant.
Negation
It is not true that John came yesterday.
  It is not true (that) takes its scope and changes its truth-value to false. John did not come yesterday
  In this case, not has scope over the verb-phrase come yesterday. The above are examples of basic cases of scope, but scope is pervasive in natural language and occurs often when two expressions combine with each other. For example, in:
Three dogs were barking seven times at two cats
Three dogs has scope over the rest of the sentence,
seven times barking has scope over two cats,
seven times has scope over barking, Determination of scope can be ambiguous, and such ambiguity may cause the overall meaning of the sentence to be ambiguous. The following is a traditional example of this:
A bullet killed every soldier.
One meaning of the sentence suggests that a bullet has scope over the rest of the sentence, implying there was exactly one bullet, and that all soldiers were killed by it. However, a more natural reading of the sentence suggests that every soldier has scope over the rest of the sentence. In this meeting, different bullets killed different soldiers.

The tools and techniques described herein may provide an ambiguity preserving system, such as an ambiguity-enabled context-sensitive search index may represent alternative scopes. In addition, rules for propagating valence shifts may result from recursive application of valence shifting. Canceling expressions may be handled using logical systems, including but not restricted to a semantic processing system of re-write rules, GLUE semantics, and the like.

The above examples all involve the effect of scope on the denotational meaning of language: house denotes the-things-we-live-in, walk denotes one way we move, red is a color, sentences have truth value, etc. However, scope may influence values assigned to words in the same way. In particular, attitude valuations may be sensitive to scope. For example, in the sentence John did not bitch about the coffee stains, the negation has scope either over bitch or over the whole rest of the sentence (i.e., . . . bitch about the coffee stains). In the reading where the negation has scope over bitch, the negation would neutralize the negative attitude carried by bitch (i.e., John may have only made an innocent remark about the stains).

In the other case, in which the negation has scope over the whole rest of the sentence, it is less clear whether the negation applies only to the about part. For example, John might have "bitched about" something else, and the attitude is still negative. In such cases, the ambiguity preserving system may encode the different possible readings of a given sentence (or higher-level construct as well).

Scope interaction within other parts of speech and phrases may similarly influence attitude calculations. For example, faint praise is not real praise, and therefore is not positive. As another example, the opposite of an idiot is not stupid and is therefore positive. In although he is a brilliant mathematician, the term although blocks the positive, preparing the reader for the continuation but he is a horrible person. In addition, a word may denote an entity or situation known to be bad or good. However, when such words are used in their literal senses, these words may communicate otherwise good or bad events with a neutral valence. For example, verbs such as murder, kill, or the like may describe various bad events with neutral valence. However, these same words may carry valence when used with unusual or unexpected arguments. Put differently, while some words may carry neutral valence when used literally, the same words may carry positive or negative valence when used metaphorically. Such words may be metaphorically extended to denote valence when used with unusual or unexpected arguments. Thus, in the sentence "John killed Bill when he entered the room," the verb "killed" is used in a literal sense to provide a valence-neutral description of a killing event. However, in the sentence "John killed the poker game when he entered the room," the verb "killed" is used metaphorically to provide a valence-negative characterization of the effect that John had on the poker game when he entered the room.

Semantic scope within the sentence is derived from syntactic embedding and is normally directly derived from it. With this in mind, the semantic processing component may define transformations of syntactic structures into semantic structures with scope-relations between the resulting meanings. Alternatively, in a purely semantic processing system where no syntactic structure is pre-computed or computed only after syntactic processing, the semantic processing component may define semantic structures with scope-relations between the resulting meanings directly. For example, when the sentence Susan bitched about John liking Paris is processed by the semantic processing component, this results in an output of the semantic processing. Express relations between so-called skolem-variables in one part of the semantic processing output may be linked to the actual meanings of words in another part of the semantic processing output. The relationships between the words denoted by the skolems may be written more concisely as:

Susan semantic-subject-of bitch
bitch about like
John semantic-subject-of like
Paris semantic-object-of like.

As a consequence, the meaning of the phrase John liking Paris is in the scope of the bitch about, as expressed in the following bracket notation:

[Susan$_{subject}$ bitch_about$_{relation}$[John$_{subject}$ like$_{relation}$ Paris$_{object}$]$_{oblique}$]

As indicated in this notational example, John has a positive attitude towards Paris, and Susan has a negative attitude towards the fact that John likes Paris.

Similarly, to illustrate adjectives, the sentence The friendly dog does not like a horrible cat may be processed through a semantic processing function. Note that in this example, the semantic processing component explicitly distinguishes between contexts, providing an example of how scope is expressed in this description. An outermost context or scope (e.g., 412 in FIG. 4) may be denoted with appropriate notation. An embedded context (e.g., 420 in FIG. 4) may identify the scope of the negation "not", in which most of the semantic processing facts hold.

The above example can be simplified as the following bracketed structure:

[Not$_{modifier}$[[friendly$_{modifier}$ dog]$_{subject}$ like$_{relation}$ [horrible$_{modifier}$ cat]$_{object}$]]

This bracketed structure indicates that dog is in the scope of friendly, cat is in the scope of horrible, and the whole predication is in the scope of the negation.

Ambiguity

If the parse of a given expression is ambiguous, or if the semantic processing function results in ambiguity in interpreting the expression, the semantic processing output may encode the multiple choices resulting from the ambiguous parse. For example, the sentence Susan saw Kim upstairs is ambiguous, between the seeing being upstairs (labeled A1) or Kim being upstairs (A2), where the only shared element (1) states that Susan is doing the seeing.

```
cf(1, in_context(t,role(sb,see:n(4,1),'Susan':n(0,1)))),
cf(A1, in_context(t,role(amod,see:n(4,1),upstairs:n(8,1)))),
cf(A1, in_context(t,role(ob,see:n(4,1),'Kim':n(7,1)))),
cf(A2, in_context(t,role(ob,see:n(4,1),upstairs:n(8,1)))),
cf(A2, in_context(t,role(parg,nn:n(7,1),'Kim':n(7,1)))),
cf(A2, in_context(t,role(pmod,upstairs:n(8,1),nn:n(7,1)))),
cf(A2,
in_context(t,role(vgrel,upstairs:n(8,1),'Kim':n(7,1)))),
```

The semantic processing system transparently deals with ambiguous parses and analyses, and generates index facts, such as the non-limiting example shown above, for all possible readings.

Attitude

To encode attitude in this setting, the semantic processing can add additional semantic processing facts of the following form. For example, for Susan bitched about John liking Paris, the semantic processing function may add the following illustrative, but non-limiting, facts:

```
cf(1, in_context(t,role('ATT-NEG',ctx(like:n(7,1)),'Susan':n(0,1))),
cf(1, in_context(t,role('ATT-POS',Paris:n(12,1)) ,'John':n(5,1))),
cf(1, in_context(t,role(about-neg,bitch:n(3,1), 'John':n(5,1))),
cf(1, in_context(t,role(about-neg,bitch:n(3,1), like:n(7,1))),
cf(1, in_context(t,role(about-neg,bitch:n(3,1), 'Paris':n(12,1))),
```

In this example, Susan has a negative attitude towards John liking Paris, and John has a positive attitude towards Paris. The about-neg operator is derived from the ATT-NEG operator, and provides a mechanism for indexing information suitable for answering questions or queries like "Who was negative about Paris?" and "Who was negative about John?"

In another example sentence, The friendly dog does not like a horrible cat, additional semantic processing facts may include:

```
cf(1, in_context(t,role('ATT-NEG',t,cat:n(15,1)))),
cf(1, in_context(t,role('ATT-POS',t,dog:n(15,1)))),
cf(1, in_context(t,role('ATT-NEG',dog:n(15,1),cat:n(15,1)))),
```

These semantic processing facts may denote that the top-level (i.e. the author of the sentence) has a negative attitude towards the cat, and has a positive attitude towards the dog. Additionally, the dog has a negative attitude towards the cat.

In certain human languages (e.g., English), scope ambiguities may be resolved by verbal emphasis or stress, intonation, and/or prosody, which identify focus and can help disambiguate scope. For example, John did *not* bitch about the coffee stains (emphasizing not), can be interpreted by asserting that the negation has scope over the whole construct bitch about the coffee stains. In John did not *bitch* about the coffee stains (emphasizing bitch), the stress indicates the negation has scope over bitch. In John did not bitch about the *coffee* stains (emphasizing coffee), the stress indicates that John most likely was bitching about something else altogether. In these examples, valence in the first case is properly assumed to be neutral, as it is in the second case, while in the third interpretation, the valence remains negative.

In some cases, however, such as the sentence John complained that Mary, his lovely and popular older sister, was bothering him, some attitudinal ambiguities may be difficult to resolve. In this example, one cannot determine with certainty whose attitude towards MARY'S LOVELINESS AND POPULARITY is being reported: John's or the Author's. In this case, the sentiment marking is ambiguous and would be indexed and manipulated accordingly. Tokens that define attitude and valence, like any other semantic token, may be stored in the index with ambiguity labeling. Attitudinal ambiguity may then be treated within the index analogously to any other type of ambiguity.

Since humans recognize the presence of two voices through incongruity of tone or lexical choice within the indirect speech, manual or automatic means for identifying such lack of congruity may be used to resolve ambiguity of this type. In some scenarios, speech recognition systems capable of prosodic analysis may provide disambiguating information for the purpose of sentiment analysis.

In addition, valence shifting can result from factives, counter-factives, and implicatives, which are verbs that imply the truth or falsehood of their argument. An example of a factive is "forget": "John forgot he needed a key" implies "he needed a key". An example of a counter-factive is "pretend": "John pretended he needed a key" implies "he did not need a key". An example of an implicative is "manage": "John managed to open the door" implies "John opened the door". The difference between the three is their behavior under negation: the sentences, "John didn't forget he needed a key" and "John didn't pretend he needed a key" do not imply that "John needed a key" or "John did not need a key", while, in contrast, "John didn't manage to open the door" does imply that "John did not open the door." Implementations of this description may also include valence shifting of these types.

Valence Calculation Method and Related Semantic Logic Calculus

Figure 6:
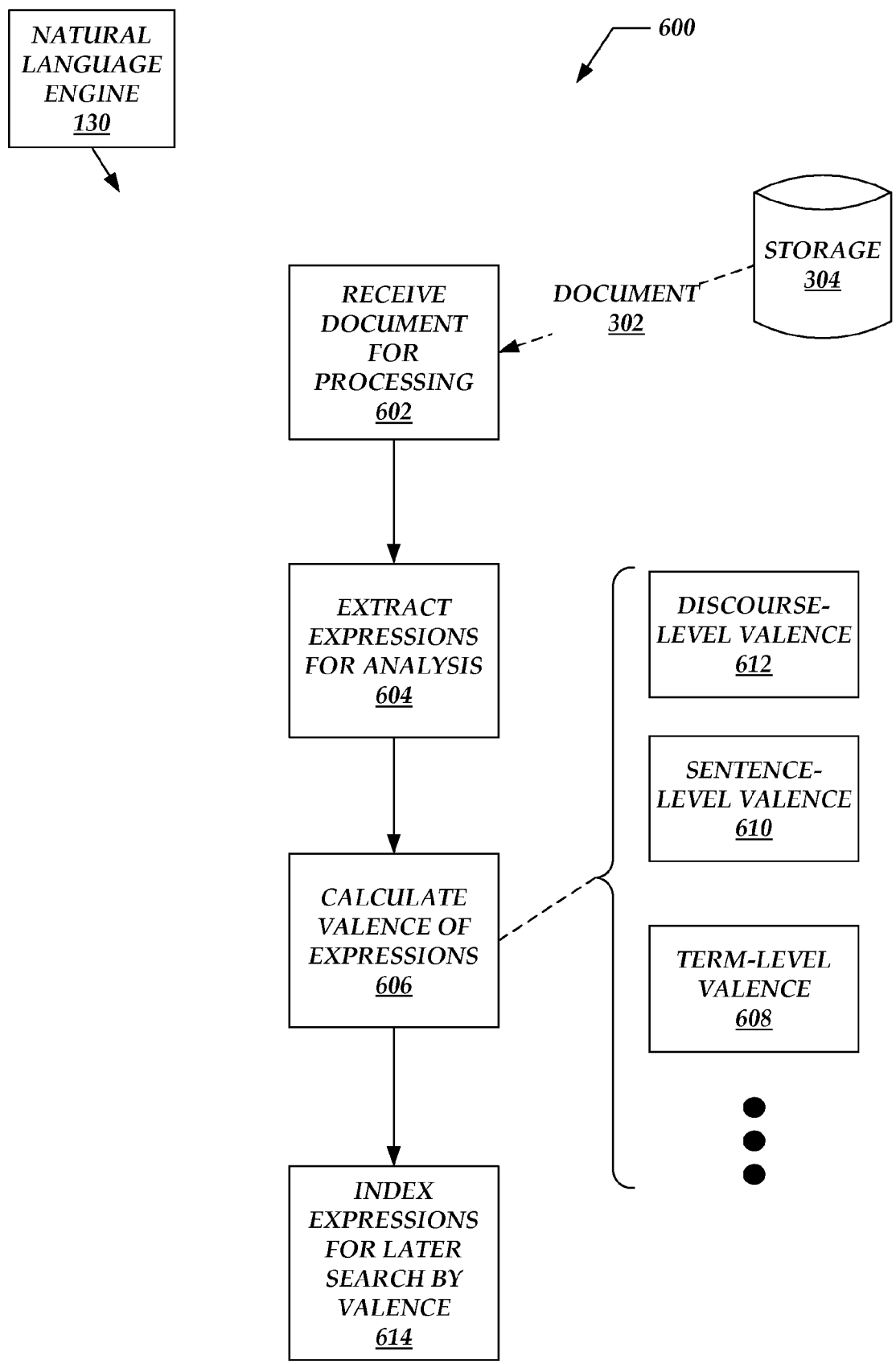
FIG. 6 is a flow diagram illustrating processes for calculating valences of input expressions.

FIG. 6 illustrates process flows, denoted generally at 600, that may be performed by the natural language engine in connection with calculating valences of input expressions. For ease of reference and description, but not to limit possible implementations, FIG. 6 may carry forward certain items from previous drawings, as denoted by identical reference numbers.

As shown in FIG. 6, block 602 represents receiving one or more input documents 302, as contained in storage elements 304. The storage elements 304 may contain any number of documents 302. The natural language engine 130 may process these documents, to calculate valence assignments for linguistic expressions contained in these documents. In this manner, the natural language engine 130 may index these documents to facilitate subsequent searches or queries that reference valence or sentiment expressed by particular speakers or authors.

Block 604 represents extracting linguistic expressions from the input document 302 for valence analysis. In different scenarios, these linguistic expressions within a given document may be relatively simple or complex.

Block 606 represents calculating valence values associated with particular expressions extracted in block 604. In different possible scenarios, block 606 may include calculating valence at the level of particular terms, as represented in block 608. Valence may also be calculated that the level of sentences, as represented generally at block 610. In addition, valence may be calculated at the paragraph or discourse level, as represented generally at block 612. These scenarios are present only as examples, and do not limit possible implementations.

Block 614 represents indexing the expressions, according to their calculated valences. In this manner, the natural language engine 130 may enable subsequent searches to be run against these expressions, with the searches specifying particular valences, sentiments, or attitudes as expressed by different speakers or authors.

Figure 7:
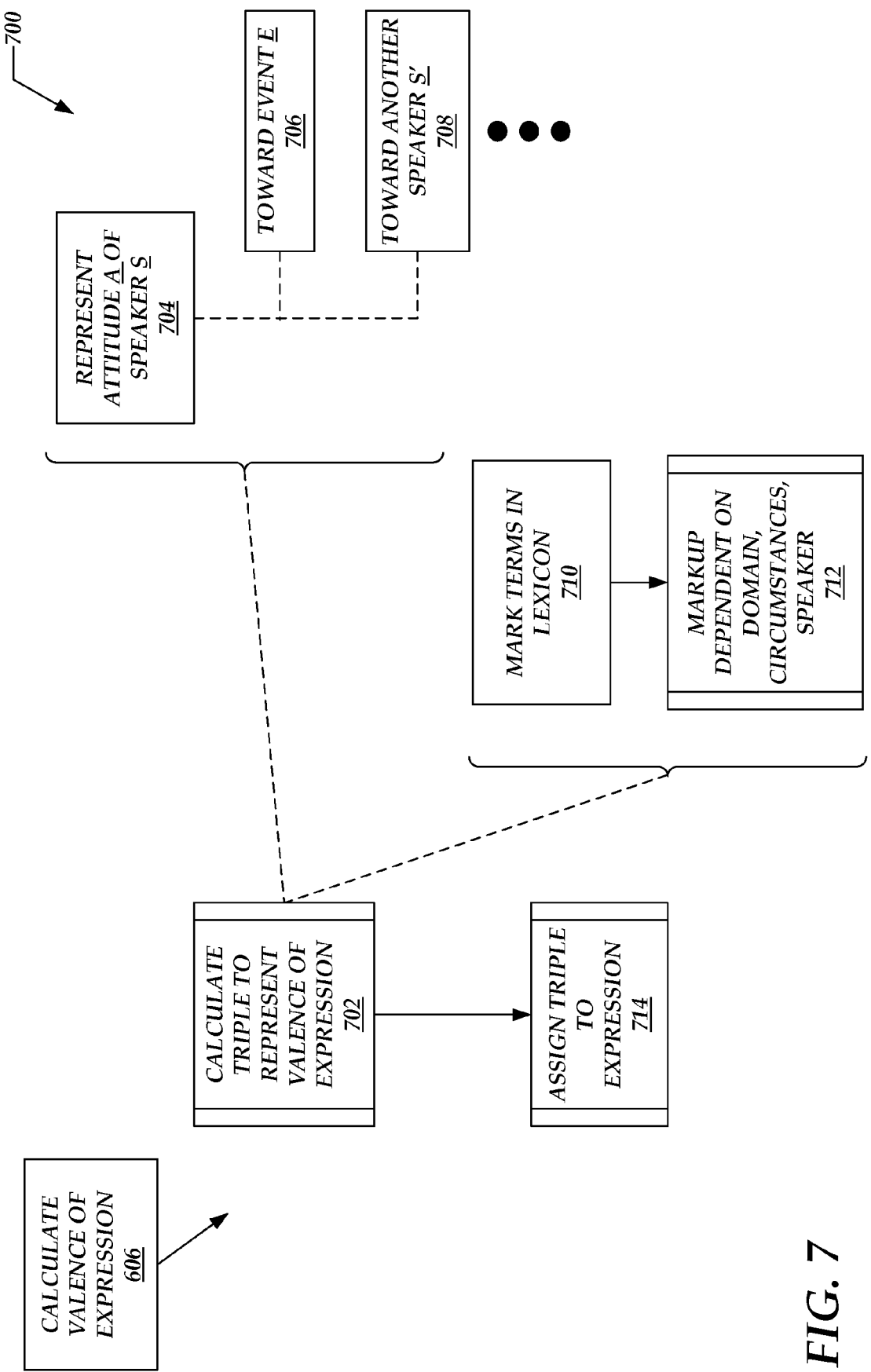
FIG. 7 is a flow diagram illustrating more detailed process flows relating to calculating valences of particular expressions.

FIG. 7 illustrates more detailed process flows, denoted generally at 700, relating to calculating valences of particular expressions. Without limiting possible implementations, the process flows 700 may be understood as elaborating further on block 606 as shown in FIG. 6.

Calculating the valence assignment of simple or complex linguistic expressions using the semantic methods as provided in this description may include calculating particular representations or these expressions, as represented generally in block 702. More specifically, block 702 may include calculating a triple <S,A,E>, with portions of the triple denoting a speaker S having an attitude A, as represented generally in block 704. The speaker S may exhibit attitude A towards some entity, event, state of affair, etc. E, as represented generally at block 706. In some cases, the speaker S may exhibit attitude A towards another speaker S', as represented generally at block 708. If there is no indirect speech or any other expression that changes the speaker, the speaker will be the author of the document.

Although this description may use the term Speaker to refer to the attitude holder for the sake of convenience, the speaker need not be speaking in all cases. For example, in the sentence John hates cauliflower, in which John holds a negative attitude towards cauliflower, the speaker may be the entity whose subjectivity is represented in linguistic expressions in the text.

Block 702 may include calculating the triple as follows.

A. Create a Lexicon of Terms

As represented in block 710, terms may include one or more words, or even outbursts or expressions (e.g., "AAArrrrrggghhhhh") used to indicate emotions, anger, pain, or the like, which may not be formally considered "linguistic expressions" at all. These terms may be marked in a lexicon, to indicate particular parts of the triple or which these terms set a definitive value. In cases where these terms take arguments, these arguments may be represented by triples as well. In these cases, the lexicon may indicate changes that these terms make in the triples representing their arguments.

In different possible implementation scenarios, the terms may be marked up in the lexicon manually by annotators, or automatically and/or semi-automatically. Examples of automatic techniques may include learning from a set of examples marked for attitude and valence scope, using known machine learning techniques such as decision trees, SVM, and others.

In addition, this markup may be dependent on different domains of use, circumstances of use, speaker characteristics, or other factors, as represented generally at block 712. Having calculated triples for particular expressions, block 714 represents assigning these triples to these expressions.

Some terms may or may not populate or set all parts of the triple for those terms. The parts of the triple that a given term does not set are left open (written as "_" below).

Figure 8:
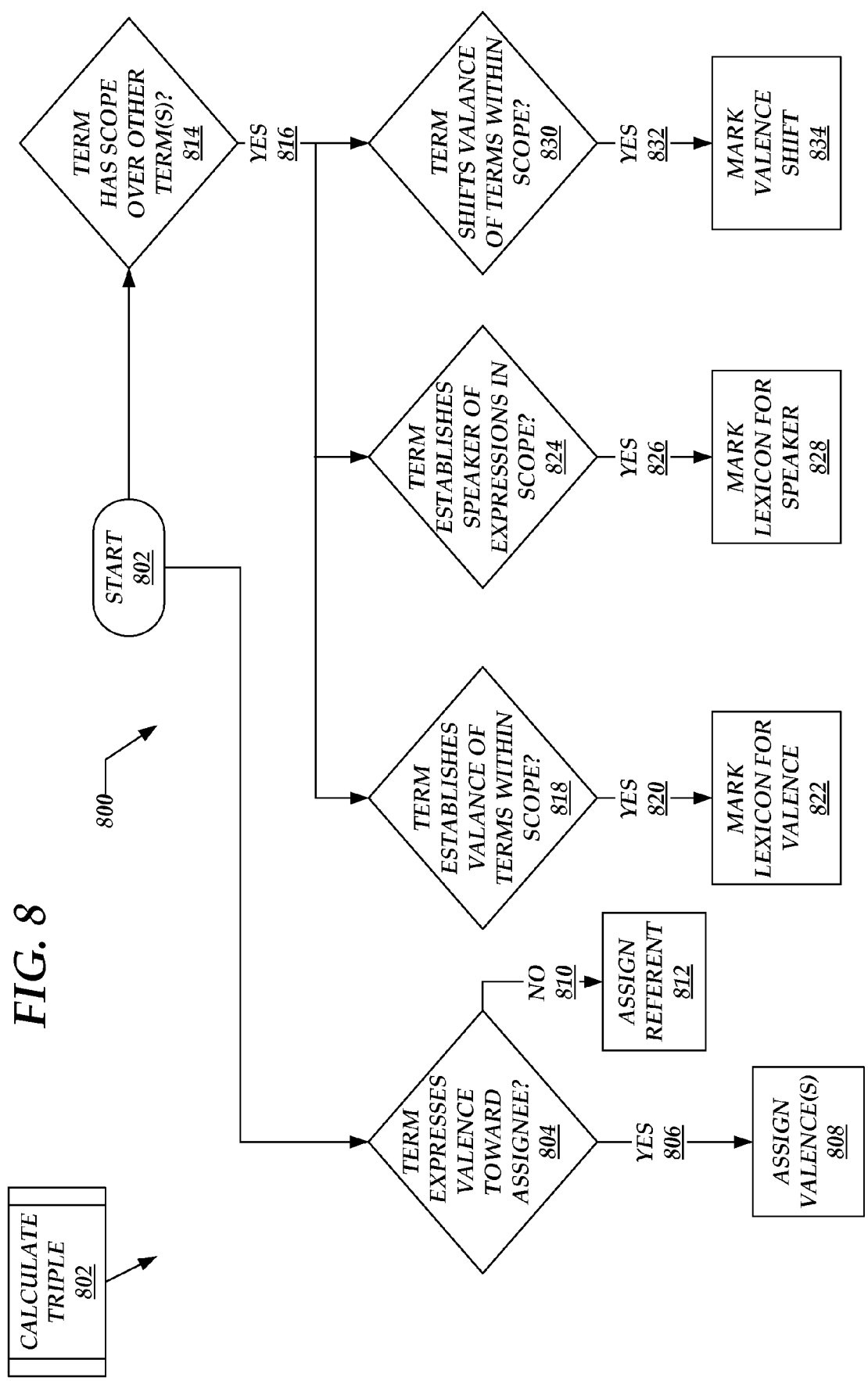
FIG. 8 is a flow diagram illustrating more detailed process flows four marking up terms in a lexicon and populating representations of these terms.

FIG. 8 illustrates more detailed process flows 800 related to marking up terms in the lexicon and populating the triple, described as follows (beginning with start state 802):

(1) as represented in decision block 804, terms that express a valence (positive, negative or neutral) towards an assignee are marked as such <−, +/−, 'e'>, with 'e' the corresponding neutral form for the meaning of the term. Assuming that 'hut' is the unmarked meaning of hovel and cottage, hovel would express a valence <_, −, 'hut'>, cottage a valence <_, +, 'hut'>. If a given term expresses valence toward an assignee, the process flows 800 may take Yes branch 806 from block 804 to block 808. However, terms that do not assign any valence are assumed to only assign a referent, as represented by No branch 810, passing from decision block 804 to block 812. For example, the term Hut corresponds to a valence triple <_, _'hut'>. It should be clear that using an actual word for the neutral form is only one way of encoding this. Another choice would be to use a non-linguistic expression like a WordNet synset or other expressions associated with the meaning of the word by some lexical or other resource.

(2) As represented by decision block 814, some terms may have scope over other terms. If a given term as scope over one or more other terms, the process flows 800 may take Yes branch 816 to perform further testing on the given term. For example, decision block 818 represents testing whether a given term establishes the attitude of any terms or expressions within its scope. These expressions within the scope of the given term may also be represented by valence triples. Such terms are called valence assigning expressions. As represented by Yes branch 820, leading to block 822, these terms may be are marked in the lexicon for the changes in the valence that they make. For example, adjectives that often assign a particular attitude to an argument are marked as valence assigning expressions. For example, bad house has a negative valence, because bad <_, −, 'bad'> assigns a negative valence to its argument house <_, _, 'house'>.

(3) As represented by decision block 824, some given terms may have scope over other terms, and may also establish the speaker of certain terms or expressions within their scope. These terms or expressions within the scope of the given terms may also be represented by valence triples. These given terms are called speaker assigning expressions. As represented by Yes branch 826 and block 828, these terms may be marked in the lexicon for the changes they make to terms within their scope. For example, speech verbs (and other verbs that attribute speech to people) may change the speakers represented in arguments to these verbs. For example, in the case of said, in John said he lived in a bad house, the speaker having the attitude towards the house will be set to John. In the case of John hates cauliflower, John is the "speaker" whose attitude towards cauliflower is negative.

(4) As represented by decision block 830, some given terms may have scope over other terms, and may also change or shift the valence of one or more terms or expressions within the scope of the given terms. These terms or expressions within the scope of the given terms may also be represented by valence triples. These given terms are called valence shifters. As represented by Yes branch 832 and block 834, shifts in valence may be marked in the appropriate triples. Such valence shifters can change or reverse previously-expressed positive and negative attitudes (e.g., not good, not bad). These valence shifters may also neutralize previously-expressed valence (e.g., almost in the expression the cheese was almost spoiled).

In some cases, valence may shift because of scope relations between two terms, or scope relations between three or more terms. More specifically, these terms may exhibit mismatched valence (e.g., "lovely predator", "wonderful tyrant", "predatory sweetheart", and the like), and the valence of the overall expression may shift, depending on the scope relations established by the expression for these terms. The following examples illustrate more valence-shifting scenarios, arising from mismatches in valence occurring in terms:

"John detested the lovely cuddly little munchkin." Even though "lovely cuddly little munchkin," the object of the verb "detested," conveys positive valence because all four words are positive, the overall valence of the sentence shifts to negative because the verb "detested" conveys negative valence and has scope over its object.

"The lovely cuddly little munchkin detested John." Even though the subject of the verb "detested" conveys strong positive valence, the overall valence of the sentence shifts to negative because the verb "detested" conveys negative valence and has scope over its subject.

"The lovely cuddly little munchkin detested the adorable sweetheart." Even though both the subject and object of the verb "detested" convey positive valence, the overall valence of the sentence shifts to negative because the verb "detested" conveys negative valence and has scope over its subject and its object.

"The lovely child staggered into the gorgeous ballroom." Similarly to the previous example, even though both the subject and object of the verb "staggered" convey positive valence, the overall valence of the sentence shifts to negative, because the verb "staggered" conveys negative valence and has scope over its subject and its object.

The following recursive examples illustrate further how scope relationships may shift valence, when terms exhibit mismatched valence:

"the munchkin": positive valence;

"the grotesque munchkin": negative valence, because the adjective "grotesque" has scope over the noun that it describes;

"the grotesque munchkin strode into the room": positive valence, although the subject "grotesque munchkin" conveys negative valence, the verb "strode" probably conveys positive valence, and has scope over its subject;

"the grotesque munchkin strode confidently into the room": positive valence, the adverb "confidently" "strode" conveys positive valence, and has scope over its subject;

"John complained that the grotesque munchkin strode confidently into the room": negative valence, the verb "complained" conveys negative valence, and has scope over the rest of the sentence, shifting the valence of the previous example.

In some cases, terms in the lexicon may be annotated for more than one of valence-related operations, and may also introduce more than one triple. For example, bitched in John bitched about the weather associates a negative attitude of the author towards the target John, and also associates a negative attitude of speaker John towards the target the weather.

Figure 9:
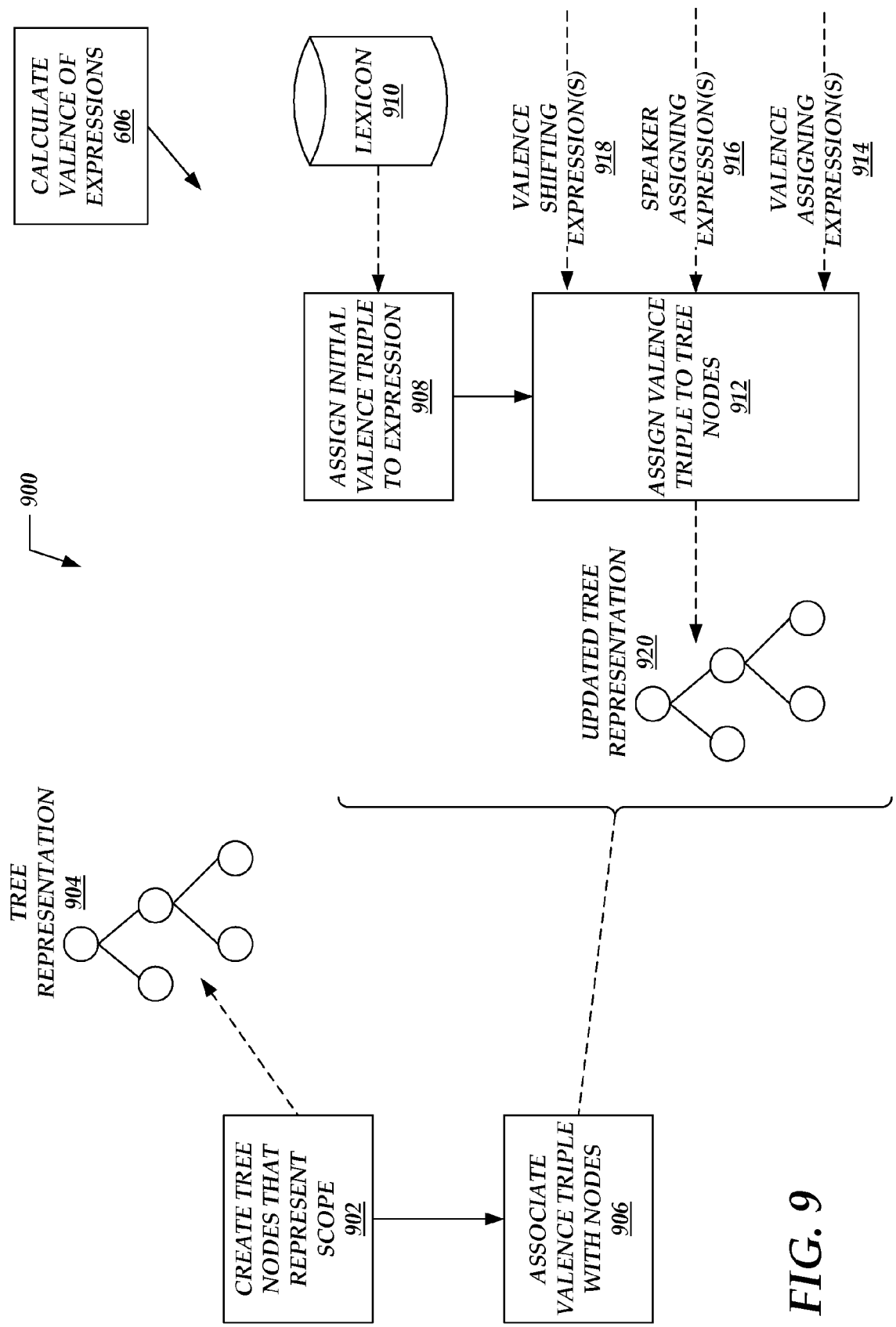
FIG. 9 is a combined block and flow diagram illustrating more detailed processes and data flows relating to calculating valences of expressions.

FIG. 9 illustrates more detailed process and data flows, denoted generally at 900, relating to calculating valences of expressions. The description of these process flows continue from FIG. 8 to FIG. 9, without limiting possible implementations.

B. Block 902 represents calculating, for every parsed phrase or sentence, a recursive representation of nodes that expresses the scope relations between various parts of the parsed phrase or sentence. FIG. 9 illustrates an example tree representation at 904. In example implementations, the semantic processing component may calculate this tree and its related nodes. In turn, block 906 represents associating a respective valence triple with the nodes of the tree 904, recursively. More specifically, block 906 may include:

1. As represented in block 908, associating an initial valence triple to every word or multiword expression, as indicated by the lexicon (e.g., 910).
2. As represented in block 912, associate a valence triple with every node in the tree recursively, taking into account the effects of valence-assigning expressions (e.g., 914), speaker-assigning expressions (e.g., 916), and valence shifters (e.g., 918). Block 912 may represent in an updated tree representation, as indicated generally at 920.

Some implementations may assign valence by propagating polarity.

Figure 10:
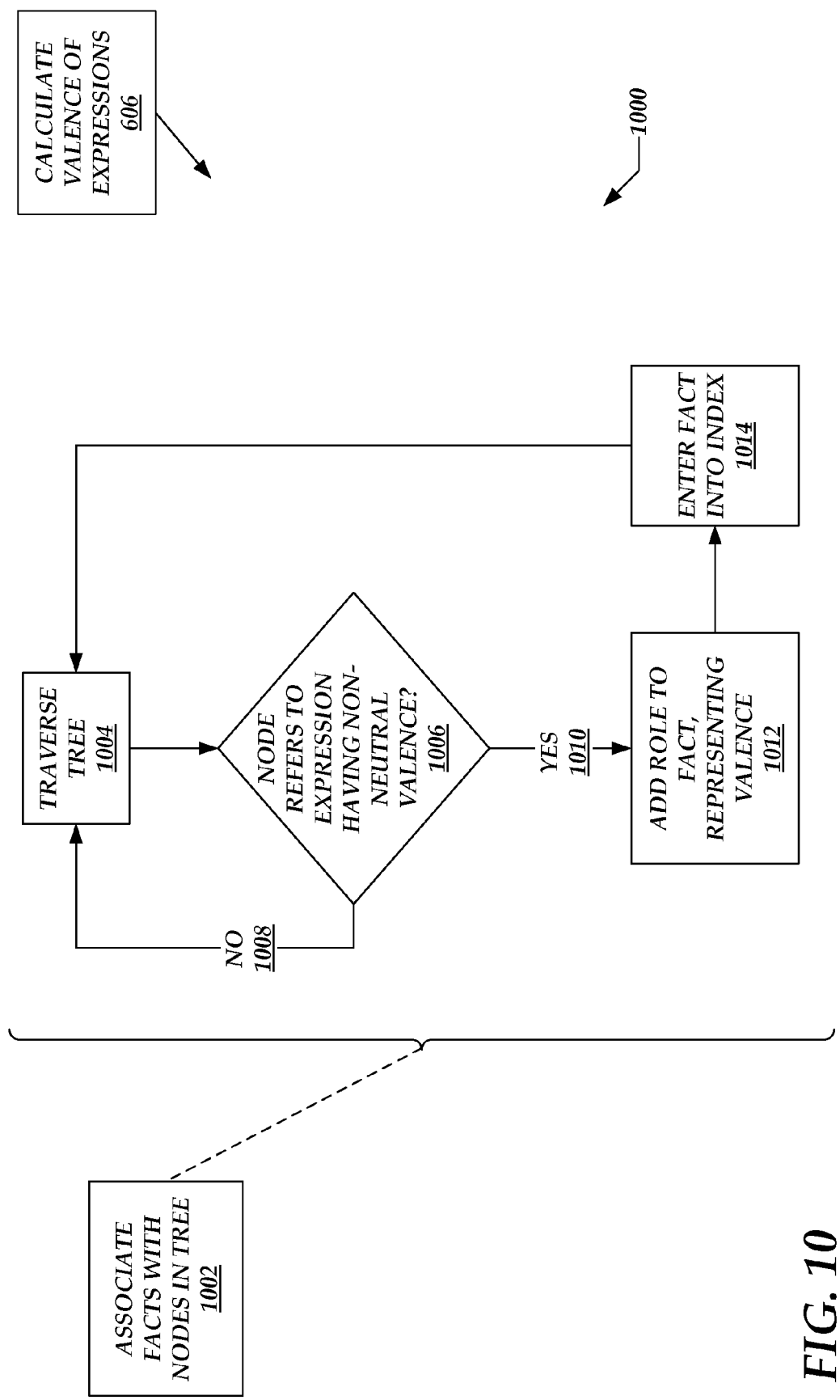
FIG. 10 is a flow diagram illustrating more detailed processes related to calculating valences of expressions.

FIG. 10 illustrates more detailed process flows, denoted generally at 1000, related to calculating valences of expressions. Without limiting possible implementations, this description continues from FIG. 9 to FIG. 10, in the interests of clarity.

C. Block 1002 represents associating one or more facts with the semantic representation, such that every part of the semantic structure represented in the tree is related to one or more facts. More specifically, block 1002 may include traversing the nodes in the tree, as represented by block 1004. Decision block 1006 represents evaluating whether a given node in the tree structure has non-neutral valence. If the given node as a neutral valence, the process flows 1000 may take No branch 1008, returning to block 1004 to select a next given node for analysis. However, if the given node has a non-neutral valence, the process flows 1000 may take Yes branch 1010 to block 1012, which represents adding a role to denote the attitude between the term and the speaker to a fact represented in the given node. In turn, block 1014 represents entering the facts, with their corresponding speakers, in an appropriate index.

In some implementation scenarios, relating specifically to indirect speech, only the scope dominance of the reporting speech verb over the content that is spoken, thought, or felt is exploited. In these scenarios, the natural language engine may index, as the valence of an entire report of speech, feeling, or thought, the speech verb valence used to frame the report, and may avoid computing the valence of the terms included in the speech. Results provided by these latter implementations, while some cases inferior to those obtained by employing the full processing described above, may nevertheless offer a favorable performance trade-off. In addition, these latter implementations may offer improvements over previously-known techniques.

As examples of these latter implementations, in the case of search, a query such as "What did President Bush complain about yesterday?" would return all negatively-valenced reports of remarks made by President Bus. However, the same query would not return positively-valenced reports, such as "Bush exulted at the victory of his favorite baseball team."

In a reported speech context, some implementations of the natural language engine 130 may use the presence or absence of valence-related features to rank search results. For example, the natural language engine may be configured to prefer passages that have negative or positive valence, as matches for queries of a given type (e.g., the examples provided in the previous paragraph). In some cases, the natural language engine may rank passages that contain positively or negatively valenced terms ahead of those passages that do not contain such valenced terms. In alternative scenarios, the natural language engine may rank passages in search results, according to whether a positive or negative term occurs in a direct syntactic argument of a reported speech verb.

In some scenarios (e.g., search queries), the natural language engine 130 may highlight passages within documents, according to their calculated valences. For example, if a given natural language search requests a certain valence (e.g., whether positive, negative, or otherwise), the search results may highlight portions that have the requested valence. In other examples, a given natural language search may be silent as to valence, but the search results may apply a first highlighting scheme to passages that have positive valence, and may apply a second highlighting scheme to passages that have negative valence, and so on.

Conclusion

In conclusion, this description provides tools and technique applicable to the domain of search (and other domains as well) that build on inputs about linguistic expressions. Such expressions may be obtained from parsing by a symbolic, statistical or other syntax/semantics analysis system as part of valence determination, or by any other method of assigning valence to individual words or assigning semantic scope relations to input. Also, mechanisms are provided for determining computational attitude marking at the level of the nominal or verbal predication, including the semantic distinction between attitude between entities and attitude relative to the author.

In cases where expressions are ambiguous, and lend themselves to more than one possible interpretation, an ambiguity management apparatus associated with the natural language engine may handle all possible interpretations of the expression. More specifically, the natural language engine may index this expression into an appropriate indexing scheme for matching ambiguous facts to queries, or for other purposes.

The assignment of a triple <speaker, attitude, valence carrier> to every fact allows for a fine-gained analysis of sentiment in a way that is not typically possible with more coarse-grained methods, while retaining the benefits provided by those methods. For example, more complex phenomena can be captured using the tools described here. Examples of such complex phenomena may include style indirect libre, as this term is used in literary studies, in which a linguistic expression (e.g., a sentence, clause, or the like) may reflect the subjectivity of more than one speaker or author). Handling such complex phenomena may be of practical significance in intelligence applications, to take one example, or court testimony, when the assignment of an attitude to a speaking agent may be of particular interest.

In providing these examples of possible domains of application, this description does not limit implementations to those domains. Instead, this description may be implemented in other domains as well.

The natural language engine described herein may use the valence of speech verbs to identify and retrieve positive, negative, or neutral speaking events, for example, in search and specifically within the domain of open domain (i.e., general web search by a web user) or consumer search. More specifically, the natural language engine may assign to reported speech or thought the valence of the speech verb, in some cases, without further manipulation. The natural language engine may use the valence of the speech verb to assign a valence to an unknown lexical item, such as the murch example above. The natural language engine may also use syntactic and/or semantic relationships between the reported speech expression and the information reported to inform the function for ranking, highlighting, or otherwise indicating valence-related information when retrieving and displaying search results.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

In addition, certain process and data flows are represented herein as unidirectional only for the purposes of facilitating this description. However, these unidirectional representations do not exclude or disclaim implementations that incorporate bidirectional flows.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. At least one computer-readable storage medium comprising computer-executable instructions stored thereon that, when executed by a computer system, cause the computer system to:
    receive at least one document for processing;
    extract at least one expression from the document, the expression containing a scope relationship occurring between at least two terms contained in the expression;
    calculate a valence of the expression based on the scope relationship between terms as defined in the expression;
    enter one or more facts in a semantic index representing the valence calculated for the expression, the semantic index comprising an inverted index mapping facts representing valence calculated for expressions in a plurality of documents to the document in which each expression occurs;
    receive a natural language query that references sentiment expressed by a speaker or author;
    translate the natural language query into a representation to be compared with the facts in the semantic index; and
    retrieve documents from semantic index relevant to the natural language query.

2. The storage medium of claim 1, wherein the instructions for calculating a valence include instructions for identifying at least one term within the expression that is within a scope of at least a second term within the expression, for calculating respective valence values associated with at least the first and second terms, and for computing a valence of the expression by analyzing a semantic relationship between the first and second terms.

3. The storage medium of claim 1, wherein the instructions for extracting at least one expression include instructions for extracting an expression that represents at least one direct speech event.

4. The storage medium of claim 1, wherein the instructions for extracting at least one expression include instructions for extracting an expression that represents at least one indirect speech event.

5. The storage medium of claim 4, wherein the indirect speech event represents an embedded speech event, in which a speaker conveys information, and represents a dominating speech event, in which an author reports on the embedded speech event, and expresses sentiment toward the information or toward the speaker.

6. The storage medium of claim 1, wherein the instructions for calculating a valence include instructions for calculating a valence of an expression to account for metaphoric use of at least one term included within the expression.

7. The storage medium of claim 1, wherein the expression represents a first instance of quoted speech, further comprising instructions for extracting at least a second expression from the document, wherein the second expression represents a second instance of quoted speech that includes the first instance of quoted speech, and further comprising instructions for repeating the calculate and enter operations for at least the second expression.

8. At least one computer-readable storage medium comprising computer-executable instructions stored thereon that, when executed by a computer system, cause the computer system to:
    calculate a representation of valence of an expression contained within an input document based on a scope relationship between at least two terms contained in the expression, the representation storing data representing an attitude of at least a first speaker toward a reported event;
    determine whether the representation expresses a neutral valence or a non-neutral valence;
    upon determining the representation expresses a non-neutral valence, enter a fact for the representation in a semantic index comprising facts representing valence calculated for expressions in a plurality of documents, the fact comprising a role denoting the attitude of the first speaker toward the reported event;
    receive a natural language query referencing sentiment expressed by a speaker or author;
    translate the natural language query into a representation to be compared with the facts in the semantic index; and
    retrieve documents from semantic index relevant to the natural language query.

9. The storage medium of claim 8, further comprising instructions for determining whether at least a first term contained in the expression falls within a scope of at least a second term contained in the expression, wherein the instructions for determine scope include instructions for determine scope by using statistical methods or by analyzing surface punctuation occurring with the expression.

10. The storage medium of claim 9, further comprising instructions for determining whether the second term shifts a valence associated with the first term, and further comprising instructions for marking the representation to incorporate the shifted valence of the first term.

11. The storage medium of claim 10, wherein the instructions for determining whether the second term shifts a valence include instructions for calculating a valence shift based on at least one factive, counter-factive, or implicative appearing in the first term or second term.

12. The storage medium of claim 10, wherein the instructions for determining whether the second term shifts a valence include instructions for calculating a valence shift based on a valence mismatch occurs between the first term and the second term.

13. The storage medium of claim 9, further comprising instructions for determining whether the second term establishes who spoke the first term, and further comprising instructions for marking the representation to indicate who spoke the first term.

14. The storage medium of claim 9, further comprising instructions for determining whether the second term establishes a valence for the first term, and further comprising instructions for marking the representation to indicate the valence of the first term.

15. The storage medium of claim 14, wherein the first term is an unknown term, and wherein the first term inherits valence from the second term, by virtue of a scope relationship between the first and second terms.

16. The storage medium of claim 8, wherein the attitude of the first speaker toward the reported event expressed in the expression is ambiguous, and multiple facts for the representation of valence are entered in the semantic index for the expression denoting different attitudes of the first speaker toward the reported event.

* * * * *